(12) United States Patent
Fukushima et al.

(10) Patent No.: US 6,940,795 B2
(45) Date of Patent: Sep. 6, 2005

(54) INFORMATION RECORDING MEDIUM, INFORMATION RECORDING AND REPRODUCTION METHOD, AND INFORMATION RECORDING AND REPRODUCTION APPARATUS

(75) Inventors: Toshiyuki Fukushima, Osaka (JP); Motoshi Ito, Osaka (JP); Shinji Sasaki, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 172 days.

(21) Appl. No.: 10/382,769

(22) Filed: Mar. 5, 2003

(65) Prior Publication Data

US 2003/0174612 A1 Sep. 18, 2003

Related U.S. Application Data

(63) Continuation of application No. 09/496,905, filed on Feb. 2, 2000, now Pat. No. 6,552,982.

(30) Foreign Application Priority Data

Mar. 8, 1999 (JP) ............................................ 11-059780

(51) Int. Cl.⁷ ................................................. G11B 5/09
(52) U.S. Cl. ............................... 369/47.52; 369/47.53; 369/47.55; 369/53.37; 369/59.14
(58) Field of Search .......................... 369/47.52, 47.53, 369/47.55, 53.37, 59.14

(56) References Cited

U.S. PATENT DOCUMENTS

| 4,827,462 A | 5/1989 | Flannagan et al. |
| 4,989,195 A | 1/1991 | Suzuki |
| 5,072,435 A | 12/1991 | Bakx |
| 5,155,719 A | 10/1992 | Masakawa |
| 5,410,527 A | 4/1995 | Ashinuma |

(Continued)

FOREIGN PATENT DOCUMENTS

| EP | 0 442 566 | 2/1991 |
| EP | 0 751 509 | 6/1996 |
| EP | 1 026 671 | 7/1999 |
| JP | 61-243974 | 10/1986 |
| JP | 61-260438 | 11/1986 |
| JP | 61-294649 | 12/1986 |
| JP | 63-251938 | 10/1988 |
| JP | 6-52547 | 2/1994 |
| JP | 6-176368 | 6/1994 |

(Continued)

OTHER PUBLICATIONS

European Search Report, Application No. EP 00 10 2541, dated Apr. 25, 2000.

Standard ECMA–272, 120 mm DVD Rewritable Disk (DVD–RAM), Feb. 1998, pp. 32–44.

* cited by examiner

*Primary Examiner*—Gautam R. Patel
(74) *Attorney, Agent, or Firm*—Renner, Otto, Boisselle & Sklar, LLP

(57) ABSTRACT

An information recording medium includes a data recording area for recording data; a first drive information area for recording first drive information: and a second drive information area for recording second drive information. The first drive information and the second drive information each include a plurality of recording and reproduction conditions, and the plurality of recording and reproduction conditions each define an operation condition of an information recording and reproduction apparatus, which can have the information recording medium mounted thereon, for recording and reproducing the data. The plurality of recording and reproduction conditions are arranged in the order of time at which the plurality of recording and reproduction conditions are recorded.

18 Claims, 11 Drawing Sheets

U.S. PATENT DOCUMENTS

| | | |
|---|---|---|
| 5,490,126 A | 2/1996 | Furumiya et al. |
| 5,631,887 A | 5/1997 | Hurst, Jr. |
| 5,636,194 A | 6/1997 | Furumiya et al. |
| 5,673,249 A * | 9/1997 | Hasegawa et al. ....... 369/53.29 |
| 5,706,271 A | 1/1998 | Hashimoto |
| 5,978,350 A | 11/1999 | Tobita et al. |
| 6,339,571 B1 * | 1/2002 | Torazawa et al. .......... 369/53.2 |
| 6,411,575 B1 | 6/2002 | Akiyama et al. |

FOREIGN PATENT DOCUMENTS

| | | |
|---|---|---|
| JP | 7-93754 | 4/1995 |
| JP | 7-99042 | 4/1995 |
| JP | 7-105563 | 4/1995 |
| JP | 8-96513 | 4/1996 |
| JP | 8-115523 | 5/1996 |
| JP | 10-116591 | 5/1998 |
| JP | 11-39687 | 2/1999 |
| JP | 11-86799 | 3/1999 |
| JP | 11-354081 | 12/1999 |

INFORMATION RECORDING MEDIUM, INFORMATION RECORDING AND REPRODUCTION METHOD, AND INFORMATION RECORDING AND REPRODUCTION APPARATUS

This is a continuation of application Ser. No 09/496,905, filed Feb. 2, 2000 now U.S. Pat. No. 6,552,982.

BACKGROUND OF THE INVENTION

1. Field of the Invention

The present invention relates to an information recording medium including a drive information area for recording drive information including a plurality of recording and reproduction conditions, and an information recording and reproduction method and an information recording and reproduction apparatus for the information recording medium.

2. Description of the Related Art

As one type of information recording medium having a sector structure, optical disks are known. Since the recording density and capacity of optical disks have recently been improved, it is important to guarantee the reliability of the optical disks. For this purpose, optical disk apparatuses perform adjusting processing for finding recording and reproduction conditions.

The recording and reproduction conditions heavily rely on the characteristics of optical disks and optical disk apparatuses. Adjusting processing for finding the recording and reproduction conditions needs to be performed after an optical disk is mounted on an optical disk apparatus in repetition, for example, each time the optical disk apparatus is started, or each time the characteristics of the optical disk or optical disk apparatus are changed by a factor such as, for example, a temperature change.

Recently, more precise recording and reproduction conditions have been demanded due to further improvement in the density and the capacity of optical disks. However, there are problems in that it requires a longer period of time for adjusting processing to obtain more precise recording and reproduction conditions, and as a result the wait time of the optical disk apparatus is extended.

SUMMARY OF THE INVENTION

According to one aspect of the invention, an information recording medium includes a data recording area for recording data; a first drive information area for recording first drive information; and a second drive information area for recording second drive information. The first drive information and the second drive information each include a plurality of recording and reproduction conditions, and the plurality of recording and reproduction conditions are arranged in the order of time at which the plurality of recording and reproduction conditions are recorded.

In one embodiment of the invention, the plurality of recording and reproduction conditions each define an operation condition of an information recording and reproduction apparatus, which can have the information recording medium mounted thereon, for recording and reproducing the data.

In one embodiment of the invention, the first drive information and the second drive information are updated so as to have identical contents with each other.

In one embodiment of the invention, the first drive information area and the second drive information area are each formed of N ECC blocks for calculating an error correction code, the N ECC blocks each include a plurality of sectors, the plurality of recording and reproduction conditions are each recorded in a corresponding sector among the plurality of sectors, and N is an integer of 1 or greater.

In one embodiment of the invention, the first drive information area and the second drive information area are each formed of a single ECC block, the single ECC block includes 16 sectors, and 16 recording and reproduction conditions are each recorded in a corresponding sector among the 16 sectors.

According to another aspect of the invention, an information recording and reproduction method is provided for an information recording medium including a data recording area for recording data, a first drive information area for recording first drive information, and a second drive information area for recording second drive information. The first drive information and the second drive information each include a plurality of recording and reproduction conditions. The method includes the steps of (a) determining whether or not the first drive information can be read from the first drive information area; (b) determining whether or not the plurality of recording and reproduction conditions included in the first drive information include a recording and reproduction condition usable by an information recording and reproduction apparatus having the information recording medium mounted thereon; and (c) when the first drive information can be read and the first drive information does not include the usable recording and reproduction condition, adjusting a new recording and reproduction condition usable by the information recording and reproduction apparatus having the information recording medium mounted thereon, and using the new recording and reproduction condition and the first drive information to update the first drive information and the second drive information.

In one embodiment of the invention, the plurality of recording and reproduction conditions each define an operation condition of an information recording and reproduction apparatus, which can have the information recording medium mounted thereon, for recording and reproducing the data.

In one embodiment of the invention, the information recording and reproduction method further includes the step of: when the first drive information can be read, using the first drive information to record and reproduce the data.

In one embodiment of the invention, the step (c) includes the step of recording the recording and reproduction condition usable by the information recording and reproduction apparatus having the information recording medium mounted thereon, the recording and reproduction condition being recorded in the first drive information as the recording and reproduction condition recorded in the first drive information most recently.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The step (c) includes the steps of (c-1) writing contents of the recording and reproduction conditions, which are written in the areas of the first drive information area assigned numbers 0 through 14, into the areas of each of the first drive information area and the second drive information area assigned numbers 1 through 15; and (c-2) writing a content of the new recording and reproduction condition in the area of each of the first drive information area and the second drive information area assigned number 0.

In one embodiment of the invention, the information recording and reproduction method further includes the step of (d) when the first drive information can be read and the first drive information includes the usable recording and reproduction condition, using the usable recording and reproduction condition and the first drive information to update the first drive information and the second drive information.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The usable recording and reproduction condition is written in an area of the first drive information area assigned number m. The step (d) includes the steps of (d-1) reading the usable recording and reproduction condition from the area of the first drive information area assigned number m: (d-2) writing contents of the recording and reproduction conditions, which are written in the area of the first drive information area assigned numbers 0 through (m-1), into the areas of each of the first drive information area and the second drive information area assigned numbers 1 through m; and (d-3) writing the content of the read usable recording and reproduction condition in the area of each of the first drive information area and the second drive information area assigned number 0.

In one embodiment of the invention, the first drive information area is formed of N ECC blocks for calculating an error correction code, the N ECC blocks each include a plurality of sectors, the plurality of recording and reproduction conditions included in the first drive information are each recorded in a corresponding sector among the plurality of sectors, and N is an integer of 1 or greater.

In one embodiment of the invention, the determination on whether or not the first drive information can be read is performed based on whether or not the reproduction of all the N ECC blocks included in the first drive information area has been successful.

In one embodiment of the invention, the information recording and reproduction method further includes the steps of (e) determining whether or not the second drive information can be read from the second drive information area; (f) determining whether or not the plurality of recording and reproduction conditions included in the second drive information include a recording and reproduction condition usable by the information recording and reproduction apparatus having the information recording medium mounted thereon; and (g) when the first drive information cannot be read, the second drive information can be read, and the second drive information does not include the usable recording and reproduction condition, adjusting a new recording and reproduction condition usable by the information recording and reproduction apparatus having the information recording medium mounted thereon, and using the new recording and reproduction condition and the second drive information to update the first drive information and the second drive information.

In one embodiment of the invention, the information recording and reproduction method further includes the step of: when the second drive information can be read, using the second drive information to record and reproduce the data.

In one embodiment of the invention, wherein the step (g) includes the step of recording the recording and reproduction condition usable by the information recording and reproduction apparatus having the information recording medium mounted thereon, the recording and reproduction condition being recorded in the second drive information as the recording and reproduction condition recorded in the second drive information most recently.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The step (g) includes the steps of (g-1) writing contents of the recording and reproduction conditions, which are written in the areas of the second drive information area assigned numbers 0 through 14, into the areas of each of the first drive information area and the second drive information area assigned numbers 1 through 15; and (g-2) writing a content of the new recording and reproduction condition in the area of each of the first drive information area and the second drive information area assigned number 0.

In one embodiment of the invention, the information recording and reproduction method further includes the step of (h) when the first drive information cannot be read, the second drive information can be read, and the second drive information includes the usable recording and reproduction condition, using the usable recording and reproduction condition and the second drive information to update the first drive information and the second drive information.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The usable recording and reproduction condition is written in the area of the second information area assigned number m. The step (h) includes the steps of (h-1) reading the usable recording and reproduction condition from the area of the second drive information area assigned number m: (h-2) writing contents of the recording and reproduction conditions, which are written in the areas of the second drive information area assigned numbers 0 through (m-1), into the areas of each of the first drive information area and the second drive information area assigned numbers 1 through m; and (h-3) writing a content of the read usable recording and reproduction condition in the area of each of the first drive information area and the second drive information area assigned number 0.

In one embodiment of the invention, the second drive information area is formed of N ECC blocks for calculating an error correction code, the N ECC blocks each include a plurality of sectors, the plurality of recording and reproduction conditions included in the second drive information are each recorded in a corresponding sector among the plurality of sectors, and N is an integer of 1 or greater.

In one embodiment of the invention, the determination on whether or not the second drive information can be read is performed based on whether or not the reproduction of all the N ECC blocks included in the second drive information area has been successful.

In one embodiment of the invention, the information recording and reproduction method further includes the step of (i) when the first drive information cannot be read and the second drive information cannot be read, adjusting a new recording and reproduction condition usable by the information recording and reproduction apparatus having the information recording medium mounted thereon, and using the new recording and reproduction condition to update the first drive information and the second drive information.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The step (i) includes the steps of (i-1) writing a content of the new recording and reproduction condition in the area of each of the first drive information area and the second drive information area assigned number 0; and (i-2) filling the contents of the recording and reproduction conditions, which are written in the areas of each of the first drive information area and the second drive information area assigned numbers 1 through 15, with "00"h.

According to still another aspect of the invention, an information recording and reproduction apparatus is provided for an information recording medium including a data recording area for recording data, a first drive information area for recording first drive information, and a second drive information area for recording second drive information. The first drive information and the second drive information each include a plurality of recording and reproduction conditions. The apparatus includes a drive information read section; an adjusting processing section; and a drive information update section. The drive information read section determines whether or not the first drive information can be read from the first drive information area; the adjusting processing section determines whether or not the plurality of recording and reproduction conditions included in the first drive information include a recording and reproduction condition usable by the information recording and reproduction apparatus; and when the first drive information can be read and the first drive information does not include the usable recording and reproduction condition, the adjusting processing section adjusts a new recording and reproduction condition usable by the information recording and reproduction apparatus, and the drive information update section uses the new recording and reproduction condition and the first drive information to update the first drive information and the second drive information.

In one embodiment of the invention, the plurality of recording and reproduction conditions each define an operation condition of an information recording and reproduction apparatus, which can have the information recording medium mounted thereon, for recording and reproducing the data.

In one embodiment of the invention, the information recording and reproduction apparatus further includes a control section for, when the first drive information can be read, using the first drive information to record and reproduce the data.

In one embodiment of the invention, the drive information update section records the recording and reproduction condition usable by the information recording and reproduction apparatus in the first drive information as the recording and reproduction condition recorded in the first drive information most recently.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The drive information update section writes contents of the recording and reproduction conditions, which are written in the areas of the first drive information area assigned numbers 0 through 14, into the areas of each of the first drive information area and the second drive information area assigned numbers 1 through 15, and writes a content of the new recording and reproduction condition in the area of each of the first drive information area and the second drive information area assigned number 0.

In one embodiment of the invention, when the first drive information can be read and the first drive information includes the usable recording and reproduction condition, the drive information update section uses the usable recording and reproduction condition and the first drive information to update the first drive information and the second drive information.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The usable recording and reproduction condition is written in an area of the first drive information area assigned number m. The drive information update section reads the usable recording and reproduction condition from the area of the first drive information area assigned m, writes contents of the recording and reproduction conditions, which are written in the areas of the first drive information area assigned numbers 0 through (m-1), into the areas of each of the first drive information area and the second drive information area assigned numbers 1 through m, and writes the content of the read usable recording and reproduction condition in the areas of each of the first drive information area and the second drive information area assigned number 0.

In one embodiment of the invention, the first drive information area is formed of N ECC blocks for calculating an error correction code, the N ECC blocks each include a plurality of sectors, the plurality of recording and reproduction conditions included in the first drive information are each recorded in a corresponding sector among the plurality of sectors, and N is an integer of 1 or greater.

In one embodiment of the invention, the determination on whether or not the first drive information can be read is performed based on whether or not the reproduction of all the N ECC blocks included in the first drive information area has been successful.

In one embodiment of the invention, the drive information read section determines whether or not the second drive information can be read from the second drive information area. The adjusting processing section determines whether or not the plurality of recording and reproduction conditions included in the second drive information include a recording and reproduction condition usable by the information recording and reproduction apparatus. When the first drive information cannot be read, the second drive information can be read, and the second drive information does not include the usable recording and reproduction condition, the adjusting processing section adjusts a new recording and reproduction condition usable by the information recording and reproduction apparatus, and the drive information update section uses the new recording and reproduction condition and the second drive information to update the first drive information and the second drive information.

In one embodiment of the invention, the information recording and reproduction apparatus further includes a control section for, when the second drive information can be read, using the second drive information to record and reproduce the data.

In one embodiment of the invention, the drive information update section records the recording and reproduction condition usable by the information recording and reproduction apparatus in the second drive information as the recording and reproduction condition recorded in the second drive information most recently.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The drive information update section writes contents of the recording and reproduction conditions, which are written in the areas of the second drive information area assigned numbers 0 through 14, into the areas of each of the first drive information area and the second drive information area assigned numbers 1 through 15, and writes a content of the new recording and reproduction condition in the area of each of the first drive information area and the second drive information area assigned number 0.

In one embodiment of the invention, when the first drive information cannot be read, the second drive information can be read, and the second drive information includes the usable recording and reproduction condition, the drive update section uses the usable recording and reproduction condition and the second drive information to update the first drive information and the second drive information.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The usable recording and reproduction condition is written in an area of the second drive information area assigned number m. The drive information update section reads the usable recording and reproduction condition from the area of the second drive information area assigned m, writes contents of the recording and reproduction conditions, which are written in the areas of the second drive information area assigned numbers 0 through (m-1), into the areas of each of the first drive information area and the second drive information area assigned numbers 1 through m, and writes the content of the read usable recording and reproduction condition in the areas of each of the first drive information area and the second drive information area assigned number 0.

In one embodiment of the invention, the second drive information area is formed of N ECC blocks for calculating an error correction code, the N ECC blocks each include a plurality of sectors, the plurality of recording and reproduction conditions included in the second drive information are each recorded in a corresponding sector among the plurality of sectors, and N is an integer of 1 or greater.

In one embodiment of the invention, the determination on whether or not the second drive information can be read is performed based on whether or not the reproduction of all the N ECC blocks included in the second drive information area has been successful.

In one embodiment of the invention, when the first drive information cannot be read and the second drive information cannot be read, the adjusting processing section adjusts a new recording and reproduction condition usable by the information recording and reproduction apparatus, and the drive information update section uses the new recording and reproduction condition to update the first drive information and the second drive information.

In one embodiment of the invention, the first drive information area and the second drive information area each include areas assigned numbers 0 through 15. The first drive information and the second drive information each include 16 recording and reproduction conditions. The 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently. The drive information update section writes a content of the new recording and reproduction condition in the area of each of the first drive information area and the second drive information area assigned number 0, and fills the contents of the recording and reproduction conditions, which are written in the areas of each of the first drive information area and the second drive information area assigned numbers 1 through 15, with "00"h.

Thus, the invention described herein makes possible the advantages of providing an information recording medium, an information recording and reproduction method, and an information recording and reproduction apparatus for reducing a time period required for adjusting processing performed to find recording and reproduction conditions.

These and other advantages of the present invention will become apparent to those skilled in the art upon reading and understanding the following detailed description with reference to the accompanying figures.

DESCRIPTION OF THE EMBODIMENTS

An information recording medium according to the present invention includes a drive information area for recording a recording and reproduction condition. An information recording and reproduction apparatus executes adjusting processing to find the recording and reproduction condition and records the recording and reproduction condition in the drive information area of the information recording medium. The recording and reproduction condition recorded in the drive information area of the information recording medium is read when the adjusting processing is executed the next time and used to find a new recording and reproduction condition.

Herein, the recording and reproduction condition refers to an operation condition of an optical disk apparatus for recording information on an optical disk or reproducing the information recorded on the optical disk.

Recording and reproduction conditions include at least one of pulse conditions regarding a laser pulse for irradiating the optical disk, servo conditions for determining various servo operations performed for recording and reproduction, and reproduction signal processing conditions for processing a reproduction signal.

The pulse conditions include, for example, a power value of a laser pulse for irradiating the optical disk for recording. Alternatively, the pulse conditions can include laser pulse conditions for forming a mark (minimum unit of information) on the optical disk. For forming a mark by irradiating the optical disk with a plurality of pulses over an area between a front end to a rear end of the mark, the pulse conditions include at least one among the timing at which a first pulse corresponding to the front end of the mark is generated, the length of the first pulse, the intensity of the laser light of the first pulse, the timing at which a final pulse corresponding to the rear end of the mark is generated, the length of the final pulse, and the intensity of the laser light of the final pulse: and are determined in accordance with the length of the mark and the length of the spaces arranged so as to interpose the mark.

Alternatively, the recording and reproduction condition can be a set value of various circuits included in the information recording and reproduction apparatus or code information representing the set value.

The adjusting processing can be simplified by re-using the recording and reproduction condition recorded in the drive information area of the information recording medium. As a result, the time period required for the adjusting processing can be shortened, and thus the wait time of the information recording and reproduction apparatus can be shortened.

Hereinafter, the present invention will be described by way of illustrative examples with reference to the accompanying drawings.

EXAMPLE 1

Figure 1:
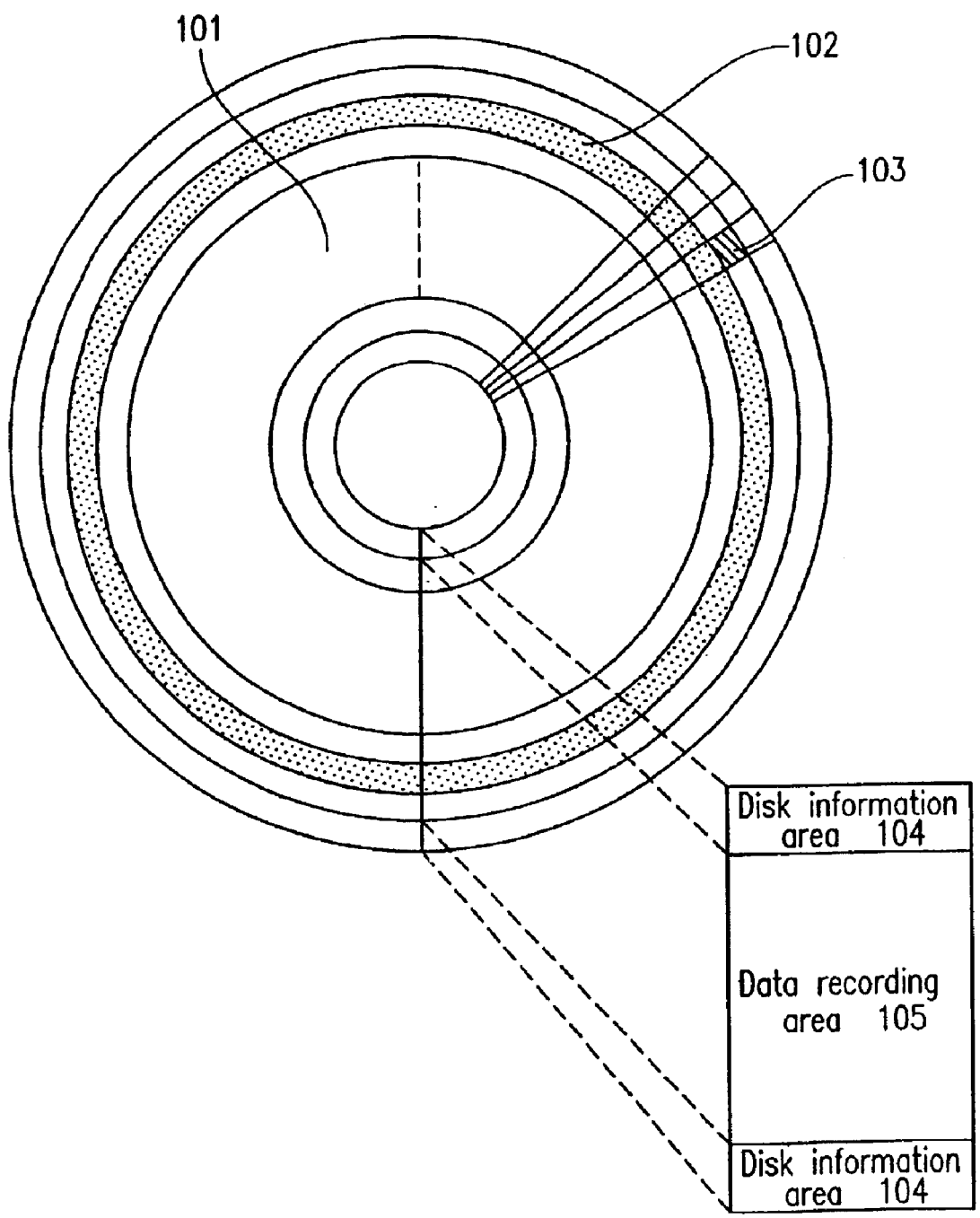
FIG. 1 is a view illustrating an information recording medium 101 in a first example according to the present invention.

FIG. 1 shows a structure of an information recording medium 101 in a first example according to the present invention. The information recording medium 101 can be any of a variety of types of optical disks such as a DVD-RAM disk.

The optical disk 101 has a plurality of tracks 102 formed in a concentric manner therein. Alternatively, the optical disk 101 has a single track 102 formed in a spiral manner therein or a plurality of tracks 102 formed in a spiral manner therein. Each track 102 is divided into a plurality of sectors 103.

The optical disk 101 includes at least one disk information area 104 and a data recording area 105.

In the disk information area 104, various parameters required to access the optical disk 101 are stored. The disk information areas 104 are located in, for example, the innermost peripheral portion and the outermost peripheral portion of the optical disk 101. The disk information area 104 located in the innermost peripheral portion of the optical disk 101 is also referred to as a "lead-in area". The disk information area 104 located in the outermost peripheral portion of the optical disk 101 is also referred to as a "lead-out area".

Data is recorded in and reproduced from the data recording area 105. All the sectors 103 provided in the data recording area 105 are each assigned an absolute address referred to as a physical sector number (hereinafter, referred to as a "PSN").

Figure 2:
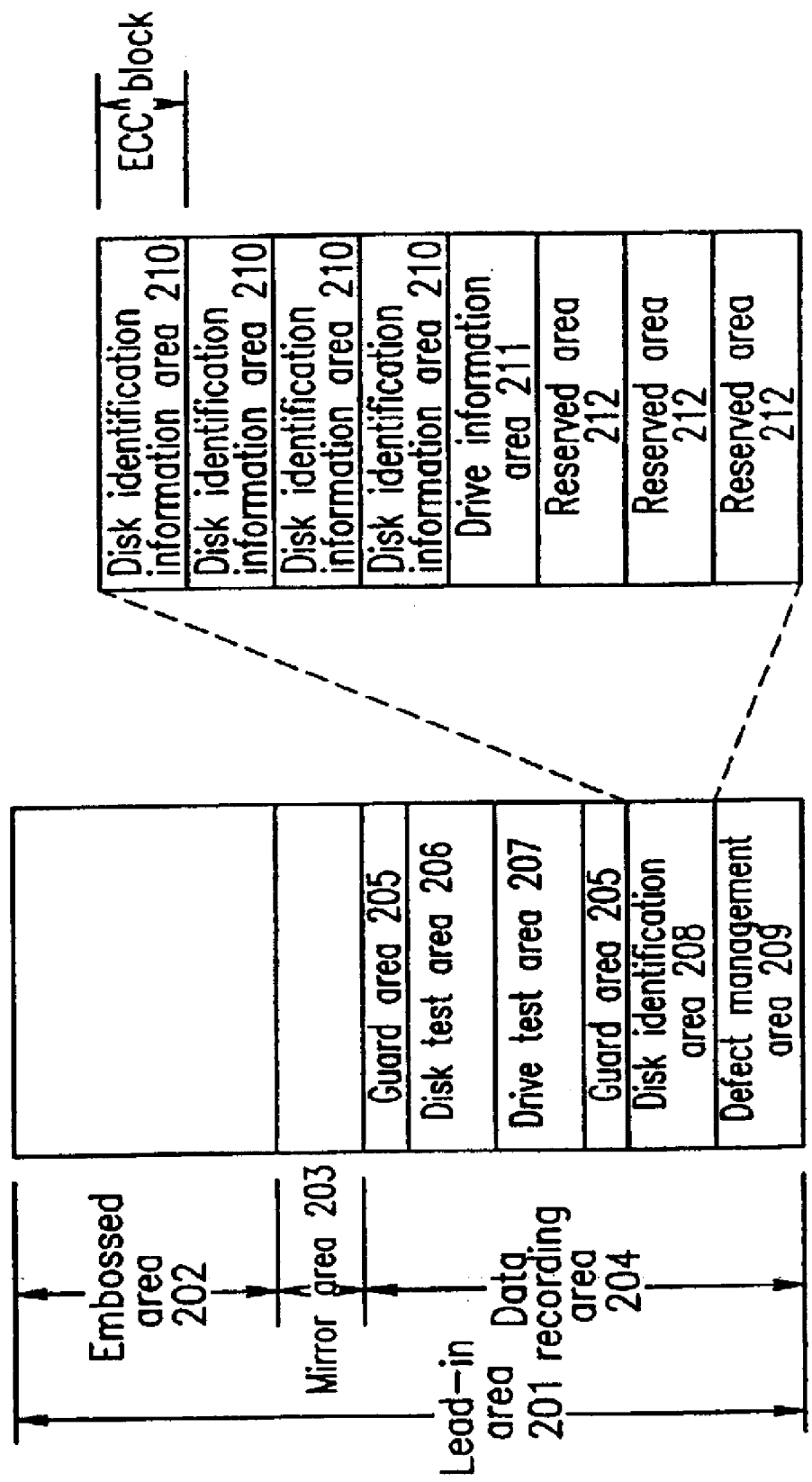
FIG. 2 is a diagram illustrating a structure of a disk information area 104 shown in FIG. 1.

FIG. 2 shows a structure of the disk information area 104 located in the innermost peripheral portion of the optical disk 101 shown in FIG. 1 (i.e., a lead-in area 201). The disk information area 104 located in the outermost peripheral portion of the optical disk 101 (FIG. 1) have an identical structure as the structure shown in FIG. 2.

The lead-in area 201 includes an embossed area 202 in which information such as identification information of the optical disk 101 is recorded by an embossed pit or the like, a data recording area 204 in which data is to be recorded, and a mirror area 203 provided between the embossed area 202 and the data recording area 204.

The data recording area 204 includes guard areas 205 not including data, a disk test area 206 used for testing the quality of the optical disk 101 in a production process of the optical disk 101, a drive test area 207 used by an optical disk apparatus for checking the state of the optical disk 101 mounted on the optical disk apparatus, a disk identification area 208 used for storing information on, for example, various characteristics of the optical disk 101, and a defect management area 209 for storing defect management information.

The disk identification area 208 includes, for example, four disk identification information areas 210, one drive information area 211, and three reserved areas 212. The four disk identification information areas 210 are each formed of one ECC block. The drive information area 211 is formed of one ECC block. The three reserved areas 212 are each formed of one ECC block. The ECC blocks are used for calculating an error correction code. The error correction code is calculated on an ECC block-by-ECC block basis.

Figure 3:
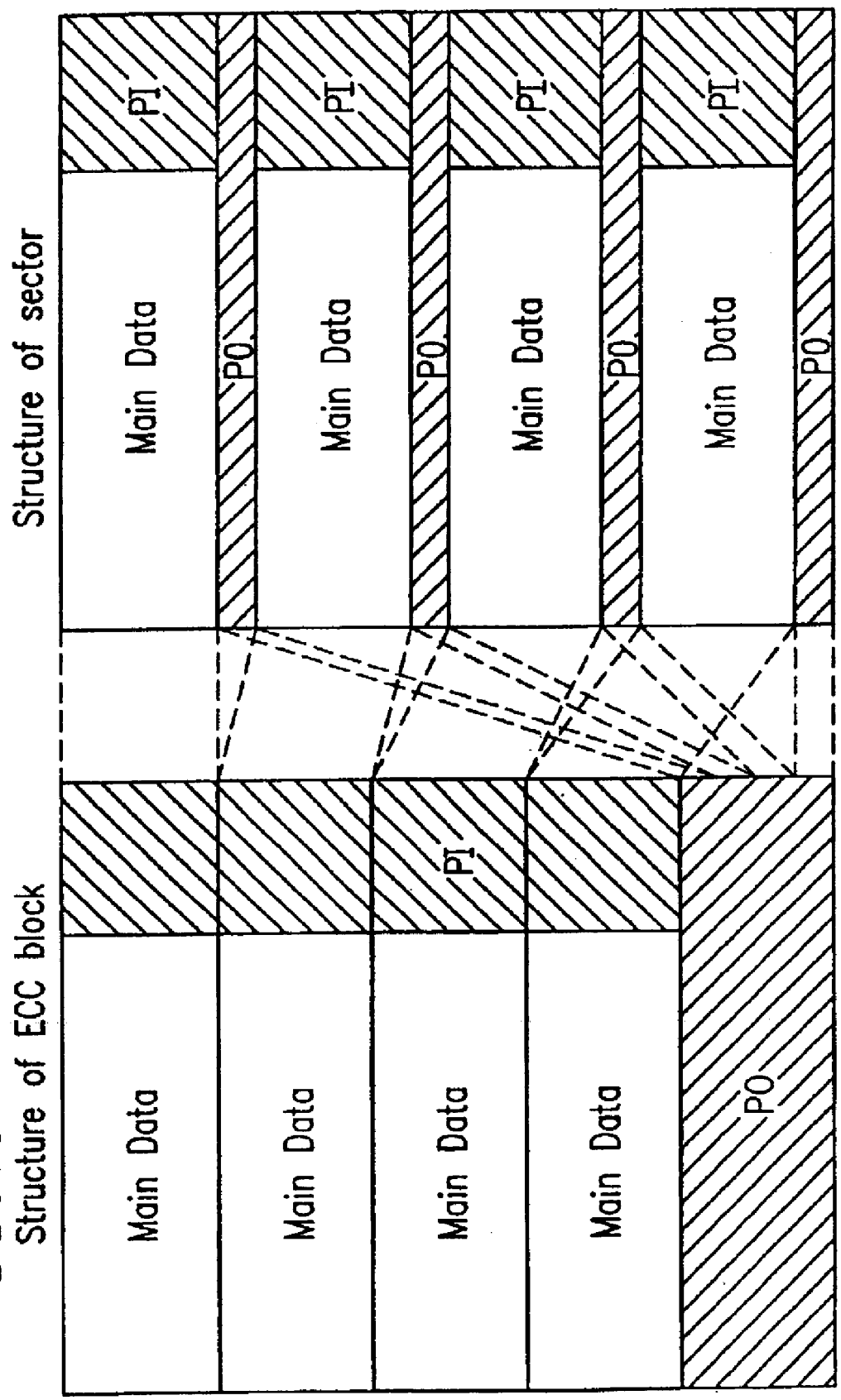
FIG. 3 is a diagram illustrating the structural relationship between an ECC block and a sector 103 provided in the optical disk 101.

FIG. 3 shows the structural relationship between the ECC block and the sector 103 provided on the optical disk 101. In the case where the optical disk 101 is a large capacity optical disk (for example, a DVD), one ECC block is formed of 16 sectors in order to provide both a high error correction capability and a low redundancy. In the example shown in FIG. 3, one ECC block is assumed to be formed of four sectors for simplicity.

As shown in FIG. 3, an ECC block includes main data arranged in 172 bytes×48 rows, an inner code parity PI obtained by calculating an error correction code on a row-by-row basis of main data (in a horizontal direction), and an outer code parity P0 obtained by calculating an error correction code on a column-by-column basis of main data (in a vertical direction).

A code including an inner code parity and an outer code parity is generally referred to as a product code. The product code is part of an error correction system which is very useful against both random errors and burst errors (errors locally concentrated). For example, it is assumed that a burst error for two rows is generated by a scratch in addition to random errors. The burst error is mostly a 2-byte error and thus is correctable by the outer code. In a column having many random errors, some of the random errors cannot be corrected by the outer code and remain as errors, which are mostly corrected by the inner code. Even if some of the errors cannot be corrected even by the inner code, those errors can be corrected using the outer code again. In this manner, the number of errors can be decreased. In the field of DVD, use of such a product code provides a sufficient error correction capability while suppressing the parity redundancy. In other words, the capacity for the user data can be increased by the amount corresponding to the parity redundancy suppressed.

As shown in FIG. 3, the outer code parity of the ECC block is uniformly divided for each of the sectors row by row. As a result, one sector is formed of data of 182 bytes×13 rows.

When an optical disk apparatus is instructed to perform recording on or reproduction from the optical disk 101 mounted thereon sector by sector, the optical disk apparatus reproduces the ECC block including a designated sector from the optical disk 101 and performs error correction. Then, the optical disk apparatus records only the portion of data corresponding to the designated sector to the optical disk 101. When the optical disk apparatus is instructed to perform recording on the optical disk 101 mounted thereon sector by sector, the optical disk apparatus reproduces the ECC block including a designated sector from the optical disk 101 and performs error correction. Then, the optical disk apparatus replaces the portion of data corresponding to the designated sector with data to be recorded, then re-calculates the error correction code and adds the error correction code to the data to be recorded, and records the ECC block including the designated sector to the optical disk 101.

In the following description, the term "block" refers to the ECC block described above.

Figure 4:
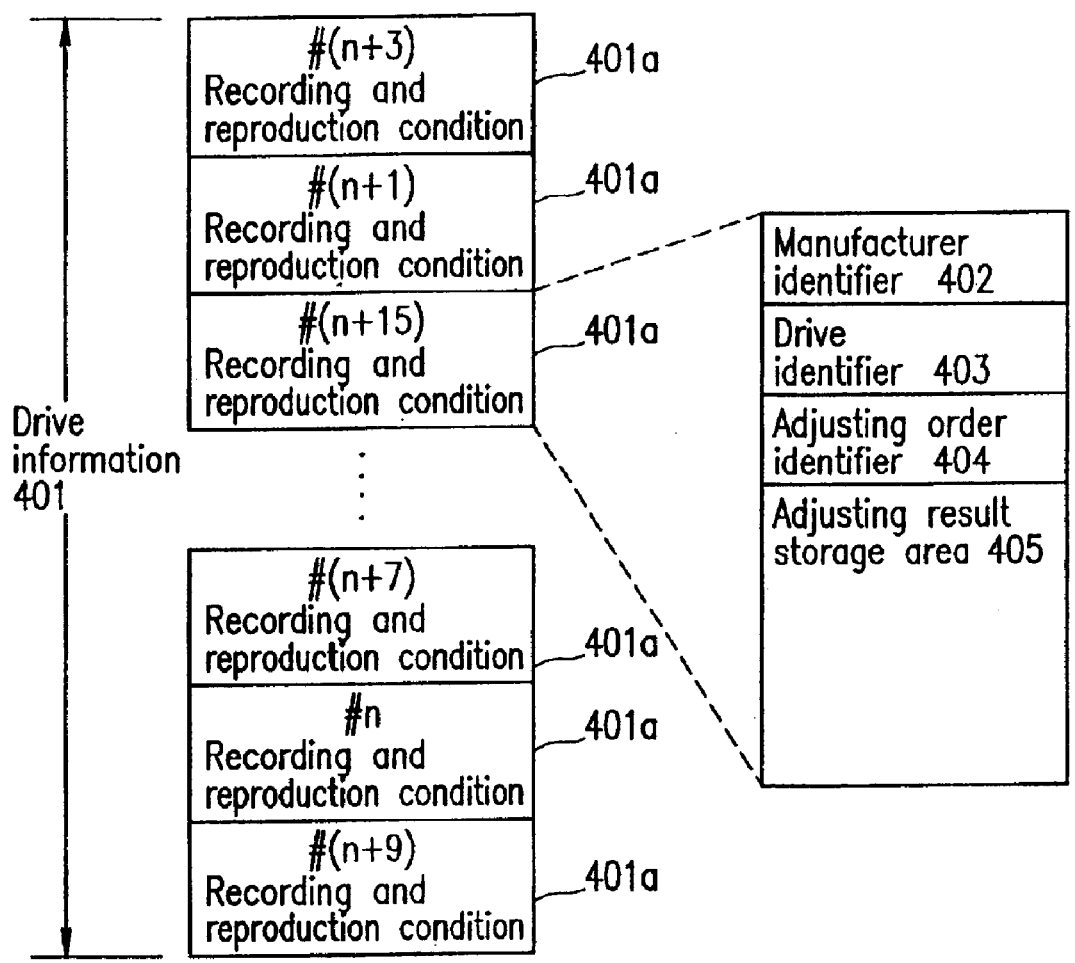
FIG. 4 is a diagram illustrating a structure of drive information 401 to be recorded in a drive information area 211 shown in FIG. 2.

FIG. 4 shows a structure of drive information 401 to be recorded in the drive information area 211 shown in FIG. 2. The drive information 401 includes a plurality of recording and reproduction conditions 401a. The plurality of recording and reproduction conditions 401a each define an operation condition of the optical disk apparatus, which can have the optical disk 101 mounted thereon, for recording and reproducing data. At least one of the plurality of recording and reproduction conditions 401a can be defined for an optical disk apparatus on which the optical disk 101 has been mounted, although it is possible for more than one of the plurality of recording and reproduction conditions to be included for the same optical disk apparatus.

The drive information 401 is represented in, for example, the format of a list of the plurality of recording and reproduction conditions 401a. Accordingly, the drive information 401 is also referred to as a recording and reproduction condition list.

In FIG. 4, the values after "#" are provided for the sake of description to indicate the time series order of the recording and reproduction conditions 401a and are not included in the contents of the recording and reproduction conditions 401a. Herein, "n" is an integer of 0 or greater. In the example shown in FIG. 4, the drive information 401 includes 16 recording and reproduction conditions 401a.

Each recording and reproduction condition 401a includes a manufacturer identifier 402 for identifying the manufacturer of the optical disk apparatus with which the particular recording and reproduction condition 401a is associated, a drive identifier 403 for identifying the particular drive of the optical disk apparatus among various drives manufactured by the manufacturer, an adjusting order identifier 404 for identifying the relative order in which the recording and reproduction condition 401a has been obtained by the optical disk apparatus (i.e., whether the condition was the first one obtained, the second one obtained, etc.), and an adjusting result storage area 405 for storing the obtained recording and reproduction condition.

Hereinafter, a method for updating the drive information 401 will be described. The optical disk apparatus reproduces the drive information area 211 provided in the lead-in area 201 the optical disk 101 mounted on the optical disk apparatus to acquire the drive information 401 before executing adjusting processing for obtaining the recording and reproduction condition.

In the case where the 16 recording and reproduction conditions 401*a* included in the drive information 401 include a recording and reproduction condition 401*a* usable by the optical disk apparatus having the optical disk 101 mounted thereon, the optical disk apparatus uses the usable recording and reproduction condition 401*a* to record data on the optical disk 101 or reproduce data recorded on the optical disk 101. For example, when a manufacturer identifier and a drive identifier possessed by the particular optical disk apparatus on which the optical disk 101 is mounted match with the manufacturer identifier 402 and the drive identifier 403 included in the recording and reproduction condition 401*a*, the recording and reproduction condition 401*a* is determined to be usable by the particular optical disk apparatus.

In the case where the 16 recording and reproduction conditions 401*a* included in the drive information 401 do not include any recording and reproduction condition 401*a* usable by the optical disk apparatus having the optical disk 101 mounted thereon, the optical disk apparatus executes adjusting processing to newly adjust the recording and reproduction condition usable by the optical disk apparatus. The optical disk apparatus uses the newly adjusted recording and reproduction condition to record data on the optical disk 101 or reproduce data recorded on the optical disk 101.

The optical disk apparatus compares the adjusting order identifier 404 included in each of the 16 recording and reproduction conditions 401*a* included in the drive information 401, and deletes the recording and reproduction condition 401*a* including the oldest adjusting order identifier 404 from the drive information 401. The optical disk apparatus records the newly adjusted recording and reproduction condition in the area where the deleted recording and reproduction condition 401*a* was located.

The drive information 401 is updated by replacing the content of the recording and reproduction condition 401*a* including the oldest adjusting order identifier 404 with the content of the newly adjusted recording and reproduction condition. The updated drive information 401 is recorded in the drive information area 211 of the optical disk 101. Thus, the update of the drive information 401 is completed.

The above-described method for updating the drive information 401 relies on the adjusting order identifier 404 to indicate which are newer and which are older among the recording and reproduction conditions 401*a* included in the drive information 401, and sometimes may not function as intended. For example, in the case where the adjusting order identifier 404 is represented by a four-digit decimal value, when the maximum value 9999 is set for the adjusting order identifier 404, the recording and reproduction condition 401*a* including the adjusting order identifier 404 having the value 9999 is never deleted from the drive information 401. Since it is advantageous for the manufacturer of an optical disk apparatus that the recording and reproduction condition usable for that optical disk apparatus is not deleted, an unethical manufacturer may intentionally configure its optical disk apparatus to set a large value as the adjusting order identifier 404.

Assuming that the manufactures may intentionally set a large value as the adjusting order identifier 404, there can be no guarantee that the drive information 401 is updated so as to always include the recording and reproduction condition 401*a* showing the most recent adjusting result.

In the first example, only one block of the drive information area 211 is provided. Accordingly, when the drive information area 211 is scratched or damaged by dust or fingerprint, there is a risk that data in the drive information area 211 cannot be reproduced.

A structure of an improved optical disk and an improved method for updating the drive information, developed for solving these problems, will be described in a second example.

EXAMPLE 2

In the second example according to the present invention, an information recording medium and an information recording and reproduction method for guaranteeing that drive information always includes a recording and reproduction condition indicating the most recent adjusting result will be described.

The information recording medium 101 in the second example has the same structure as shown in FIG. 1. The information recording medium 101 can be any of a variety of types of optical disks such as, for example, a DVD-RAM disk.

Figure 5:
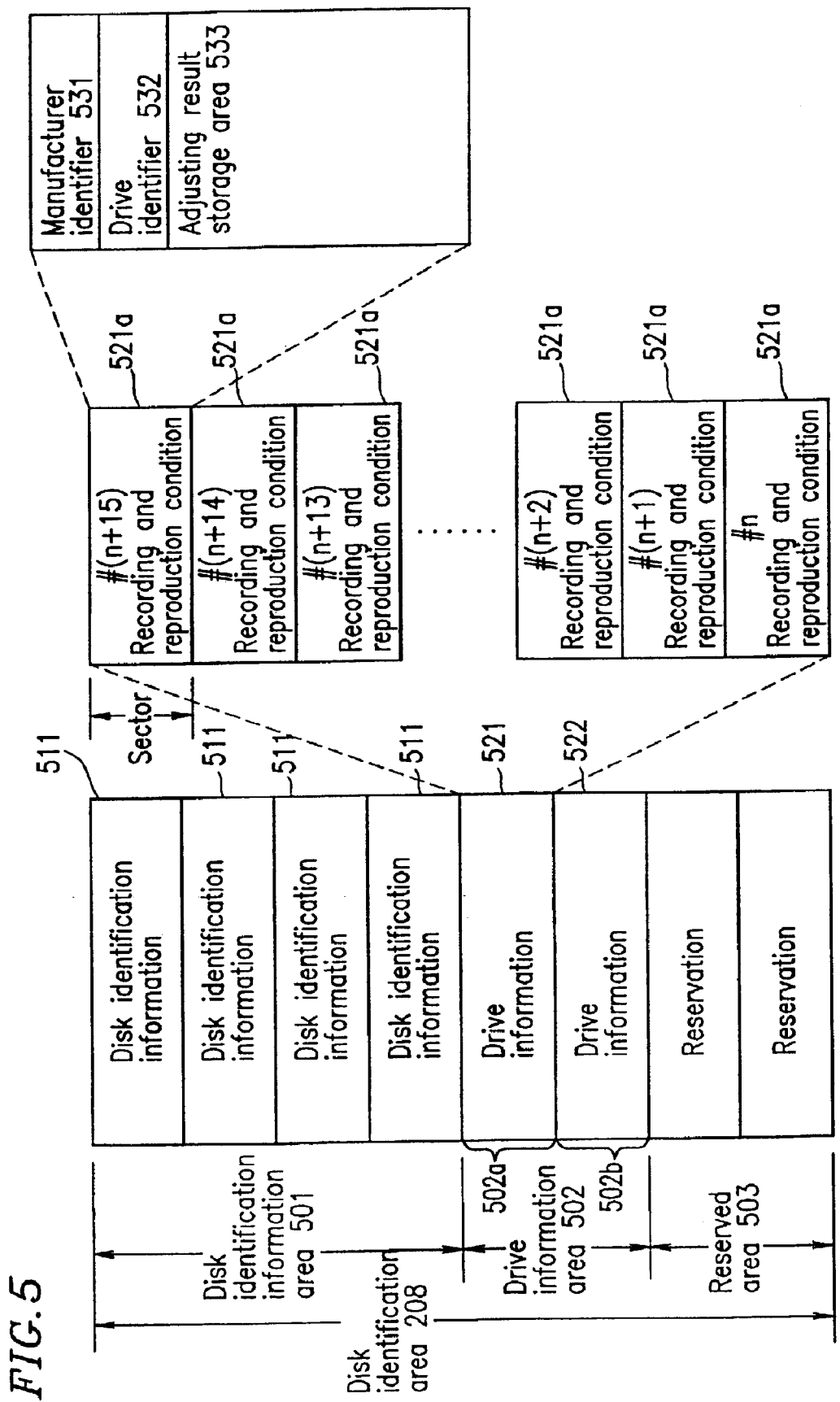
FIG. 5 is diagram illustrating a structure of information to be recorded in a disk identification area 208 shown in FIG. 2.

FIG. 5 shows a structure of information to be recorded in the disk identification area 208 shown in FIG. 2. The disk identification area 208 includes a disk identification information area 501, a drive information area 502 and a reserved area 503.

The drive information area 502 includes a first drive information area 502*a* for storing drive information 521 as first drive information, and a second drive information area 502*b* for storing drive information 522 as second drive information.

The first drive information area 502*a* and the second drive information area 502*b* are each formed of, for example, a single ECC block, and each ECC block is formed of 16 sectors.

The drive information 521 and the drive information 522 are updated so as to have identical contents with each other.

The drive information 521 and the drive information 522 each include a plurality of recording and reproduction conditions 521*a*. The plurality of recording and reproduction conditions 521*a* each define an operation condition of an optical disk apparatus, which can have the optical disk 101 mounted thereon, for recording and reproducing data. At least one of the plurality of recording and reproduction conditions 521*a* can be defined for one optical disk apparatus on which the optical disk 101 has been mounted, although it is possible for more than one of the plurality of recording and reproduction conditions to be included in the same optical disk apparatus.

The drive information 521 and the drive information 522 are each represented in, for example, the format of a list of the plurality of recording and reproduction conditions 521*a*. Accordingly, the drive information 521 and the drive information 522 are each also referred to as a recording and reproduction condition list.

In FIG. 5, the values after "#" are provided for the sake of description to indicate the time series order of the recording and reproduction conditions 521*a* and are not included in the contents of the recording and reproduction conditions 521a. Herein, "n" is an integer of 0 or greater. In the example shown in FIG. 5, the drive information 521 and the drive information 522 each includes 16 recording and reproduction conditions 521a. The 16 recording and reproduction conditions 521a are each recorded in one sector.

The 16 recording and reproduction conditions 521a are arranged in the order of time at which the recording and reproduction conditions 521a are recorded on the optical disk 101. For example, the 16 recording and reproduction conditions 521a are arranged from the condition 521a recorded on the optical disk 101 most recently to the condition 521a recorded least recently. In this case, the condition 521a recorded on the optical disk 101 most recently is located at the beginning of the recording and reproduction condition list, and the condition 521a recorded on the optical disk 101 least recently is located at the end of the recording and reproduction condition list.

Each recording and reproduction condition 521a includes a manufacturer identifier 531 for identifying the manufacturer of the optical disk apparatus with which the particular recording and reproduction condition 521a is associated with, a drive identifier 532 for identifying the particular drive of the optical disk apparatus among various drives manufactured by the manufacturer, and an adjusting result storage area 533 for storing the obtained recording and reproduction condition obtained by the optical disk apparatus as a result of execution of adjusting processing.

By recording the identical recording and reproduction conditions 521a in the drive information 521 and the drive information 522, the risk of failing to acquire the list of the recording and reproduction conditions 521a, due to scratches in the drive information area 502 or damage of the drive information area 502 by dust or fingerprint, is reduced.

The newly adjusted recording and reproduction condition 521a is always recorded at the beginning of the drive information 521 and the drive information 522. Thus, it is guaranteed that the drive information 521 and the drive information 522 always include 16 recording and reproduction conditions 521a indicating the most recent adjusting result.

In the second example, the drive information area 502 includes the first drive information area 502a and the second drive information area 502b, but the number of drive information areas included in the drive information area 502 is not limited to two. The drive information area 502 can include any number of drive information areas of 2 or greater.

The first drive information area 502a and the second drive information area 502b can each be formed of N ECC blocks. The N ECC blocks each include a plurality of sectors. The plurality of recording and reproduction conditions 521a included in the drive information 521 are each recorded in one corresponding sector among the plurality of sectors. The plurality of recording and reproduction conditions 521a included in the drive information 522 are each recorded in one corresponding sector among the plurality of sectors. Herein, "N" is an arbitrary integer of 1 or greater.

Hereinafter, with reference to FIGS. 6 and 7, a method for updating the drive information 521 will be described. The drive information 522 is updated to have the identical information with that of the drive information 521. Accordingly, a method for updating the drive information 522 is identical with the method for updating the drive information 521 and thus will not be described herein.

Figure 6:
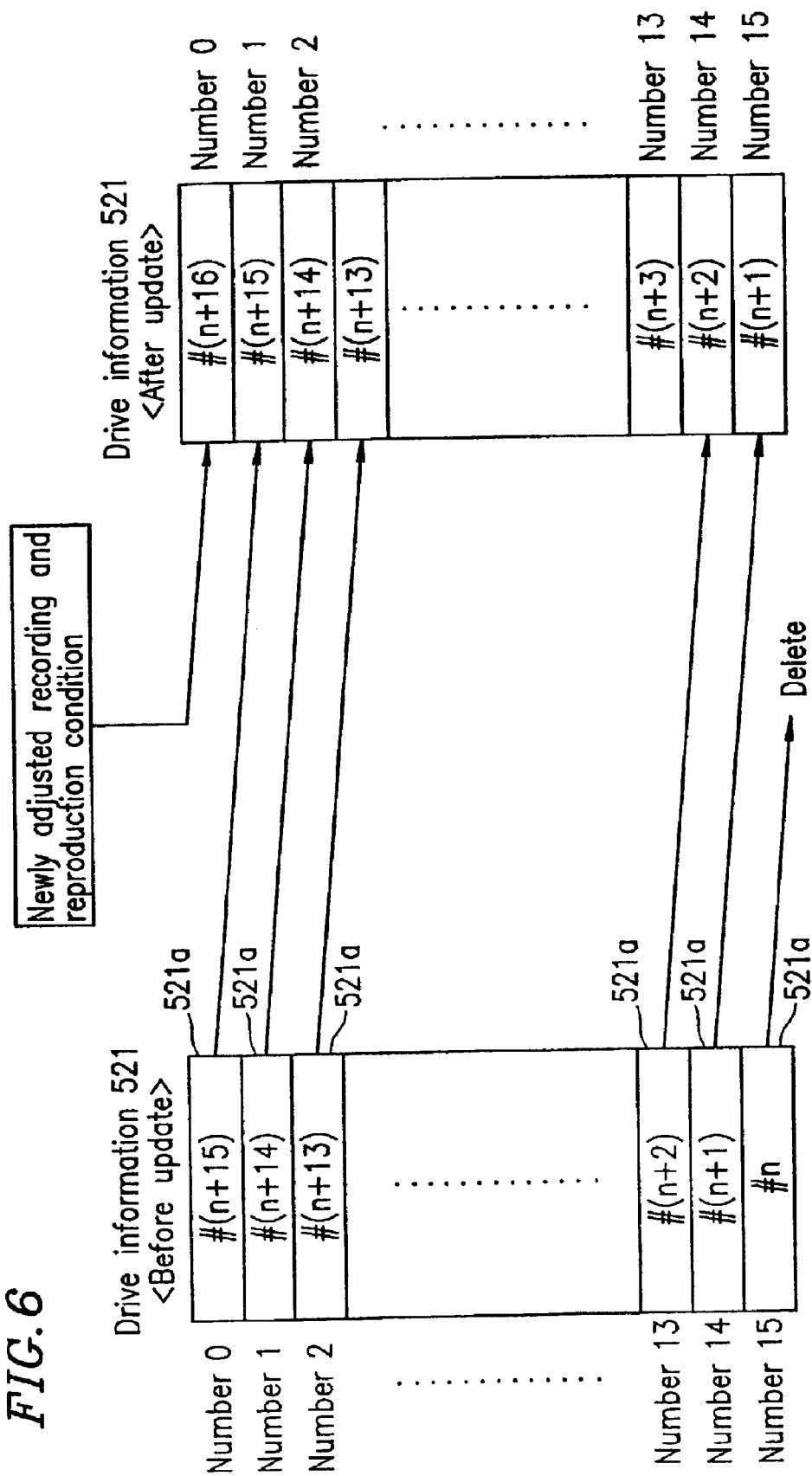
FIG. 6 is a diagram comparing a pre-update structure and a post-update structure of drive information 521 according to a first case.

FIG. 6 shows a pre-update structure of the drive information 521 in comparison with a post-update structure of the drive information 521 in the case where the 16 recording and reproduction conditions 521a included in the drive information 521 do not include a recording and reproduction condition 521a usable by the optical disk apparatus. The drive information 521 is updated when, for example, the optical disk 101 is mounted on the optical disk apparatus.

In FIG. 6, the values after "#" are provided for the sake of description to indicate the time series order of the recording and reproduction conditions 521a and are not included in the contents of the recording and reproduction conditions 521a. Herein, "n" is an integer of 0 or greater.

The first drive information area 502a includes areas assigned numbers 0 through 15. The drive information 521 includes 16 recording and reproduction conditions 521a. The 16 recording and reproduction conditions 521a are written in the areas of the first drive information area 502a assigned numbers 0 through 15 in order of the condition recorded on the optical disk 101 most recently to the condition recorded on the optical disk 101 least recently. In other words, among the 16 recording and reproduction conditions 521a, the condition 521a recorded on the optical disk 101 most recently is written in the area of the first drive information area 502a assigned number 0, and the condition 521a recorded on the optical disk 101 least recently is written in the area of the first drive information area 502a assigned number 15.

After the contents of the recording and reproduction conditions 521a written in the areas of the first drive information area 502a assigned numbers 0 through 14 are respectively written in the areas of the first drive information area 502a assigned numbers 1 through 15, the content of the recording and reproduction condition newly adjusted by the optical disk apparatus is written in the area of the first drive information area 502a assigned number 0. Thus, the drive information 521 is updated. As a result, the content of the recording and reproduction condition 521a recorded on the optical disk 101 least recently (i.e., the recording and reproduction condition 521a written in the area of the first drive information area 502a assigned number 15) is deleted from the recording and reproduction condition list.

By updating the drive information 521 in this manner, the oldest recording and reproduction condition 521a among the 16 recording and reproduction conditions 521a included in the drive information 521 is deleted. As a result, it is guaranteed that the drive information 521 always includes the most recent 16 recording and reproduction conditions 521a.

In the second example, the newly adjusted recording and reproduction condition is written in the beginning of the recording and reproduction condition list, but can be written in the end of the recording and reproduction condition list.

Figure 7:
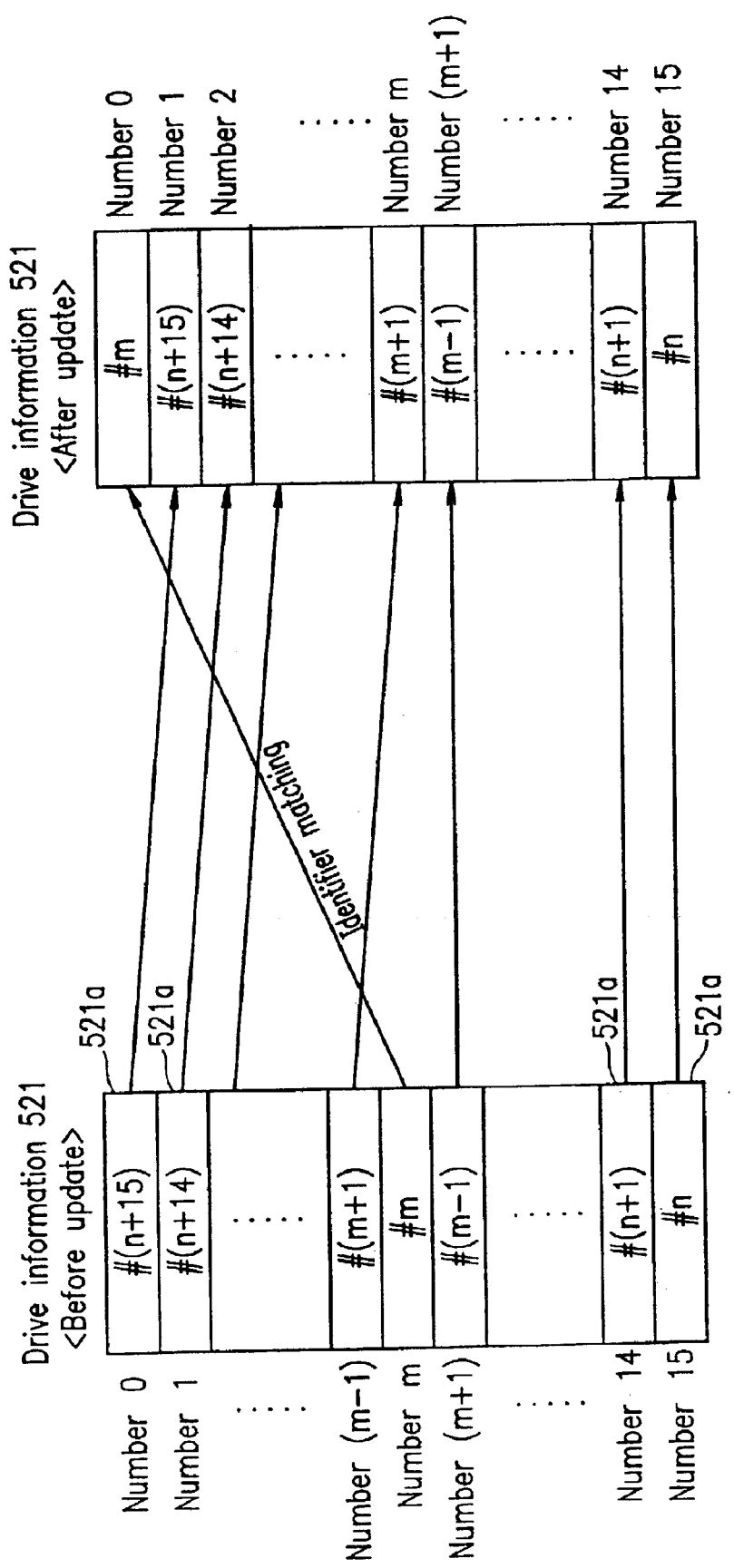
FIG. 7 is a diagram comparing a pre-update structure and a post-update structure of drive information 521 according to a second case.

FIG. 7 shows a pre-update structure of the drive information 521 in comparison with a post-update structure of the drive information 521 in the case where the 16 recording and reproduction conditions 521a included in the drive information 521 include a recording and reproduction condition 521a usable by the optical disk apparatus. The drive information 521 is updated when, for example, the optical disk 101 is mounted on the optical disk apparatus.

In FIG. 7, the values after "#" are provided for the sake of description to indicate the time series order of the recording and reproduction conditions 521a and are not included in the contents of the recording and reproduction conditions 521a. Herein, "n" and "m" are each an integer of 0 or greater.

It is assumed that the manufacturer identifier and the drive identifier possessed by the optical disk apparatus match with the manufacturer identifier 531 and the drive identifier 532 included in the recording and reproduction condition 521*a* recorded in the area of the first drive information area 502*a* assigned number m. In this case, it is confirmed that the recording and reproduction condition 521*a* is in fact usable by the optical disk apparatus. After the conformation, the recording and reproduction condition 521*a* is read from the area of the first drive information area 502*a* assigned number m. The read recording and reproduction condition 521*a* is stored in, for example, a buffer (not shown) for retreat. Next, the contents of the recording and reproduction conditions written in the areas of the first drive information area 502*a* assigned numbers 0 through (m-1) are written in the areas of the first drive information area 502*a* assigned numbers 1 through m. Then, the content of the recording and reproduction condition 521*a* stored in the buffer for retreat is written in the areas of the first drive information area 502*a* assigned number 0.

Thus, the recording and reproduction condition 521*a* usable by the optical disk apparatus having the optical disk 101 mounted thereon (i.e., the recording and reproduction condition 521*a* recorded in the area of the first drive information area 502*a* assigned number m) is written into the area of the first drive information area 502*a* assigned number 0.

By updating the drive information 521 in this manner, the most recently accessed recording and reproduction condition 521*a* among the 16 recording and reproduction conditions 521*a* included in the drive information 521 is always recorded in the area of the first drive information area 502*a* assigned number 0. As a result, it is guaranteed that the drive information 521 always includes the most recent 16 recording and reproduction conditions 521*a*.

In the second example, the recording and reproduction condition list is updated by shifting the recording and reproduction conditions including the manufacturer identifier and the drive identifier matching with those of the optical disk apparatus toward the beginning of the recording and reproduction condition list. Alternatively, recording and reproduction conditions, which are located in sectors having numbers larger than that of the sector including the recording and reproduction conditions including the manufacturer identifier and the drive identifier matching with those of the optical disk apparatus, can be shifted to smaller number sectors by one sector. In this case, the recording and reproduction conditions including the manufacturer identifier and the drive identifier matching with those of the optical disk apparatus are shifted to the end of the list.

EXAMPLE 3

A structure of an information recording and reproduction apparatus (optical disk apparatus) 800 for recording information on the information recording medium described in the second example or reproducing information recorded on the information recording medium will be described.

Figure 8:
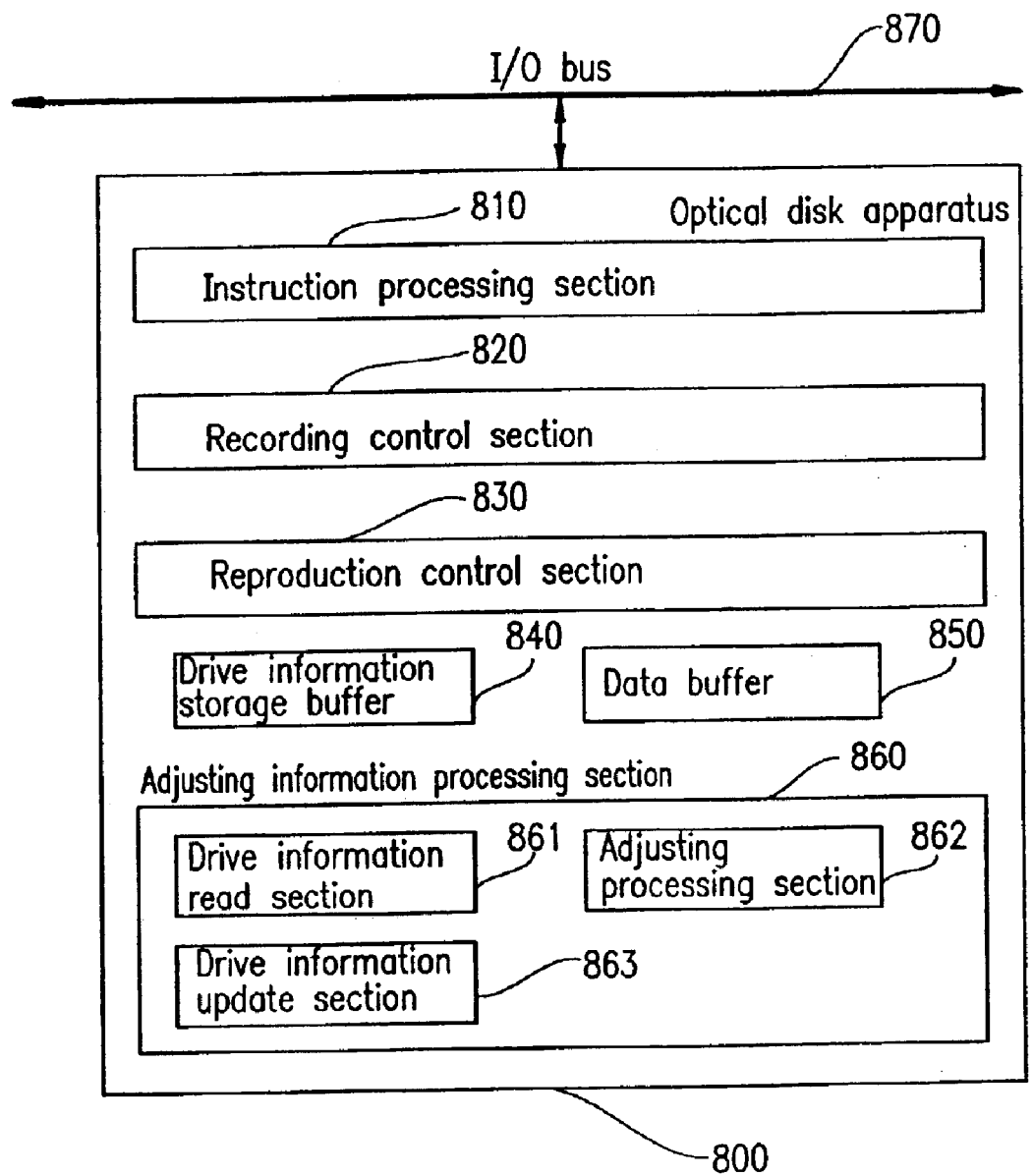
FIG. 8 is a diagram illustrating a structure of an optical disk apparatus 800 in a third example according to the present invention.

FIG. 8 shows a structure of the optical disk apparatus 800 in a third example according to the present invention.

The optical disk apparatus 800 is connected to an upper control apparatus (not shown) via an I/O bus 870. The upper control apparatus is typically a host computer.

The optical disk apparatus 800 includes, in terms of functions, an instruction processing section 810 for processing an instruction from the upper control apparatus, a recording control section 820 for controlling the recording on a rewritable disk, a reproduction control section 830 for controlling the reproduction from a rewritable disk, a drive information storage buffer 840 for storing the reproduced drive information 521, a data buffer 850 for temporarily storing recording and reproduction data, and an adjusting information processing section 860 for controlling the adjusting processing.

The adjusting information processing section 860 includes a drive information read section 861 for reading the drive information 521 from the first drive information area 502*a* and for reading the drive information 522 from the second drive information area 502*b*; an adjusting processing section 862 for controlling the adjusting processing of the recording and reproduction conditions; and a drive information update section 863 for updating the drive information 521 and drive information 522, recording the updated drive information 521 in the first drive information area 502*a*, and recording the updated drive information 522 in the second drive information area 502*b*.

Figure 9:
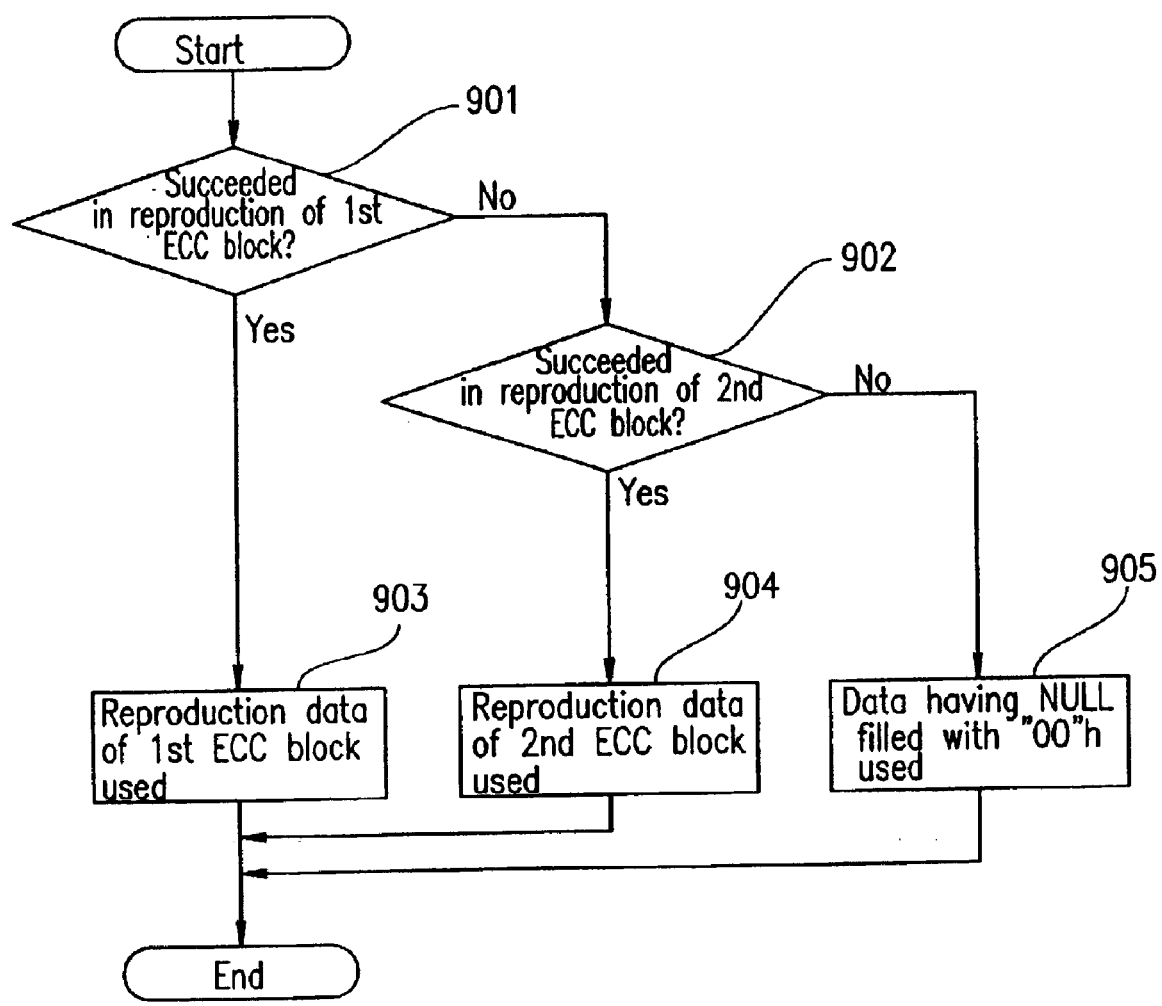
FIG. 9 is a flowchart representing drive information read processing.

FIG. 9 shows a flowchart of the drive information read processing. The processing shown in FIG. 9 is executed by the drive information read section 861 of the optical disk apparatus 800 shown in FIG. 8. In the example shown in FIG. 9, it is assumed that the first drive information area 502*a* and second drive information area 502*b* are each formed of a single ECC block.

The drive information read section 861 uses the reproduction control section 830 to determine whether or not the drive information 521 can be read from the first drive information area 502*a* in the optical disk 101 (step 901). The determination is performed based on whether or not the reproduction of the ECC block of the first drive information area 502*a* has been successful. When the reproduction of the ECC block of the first drive information area 502*a* has been successful, it is determined that the drive information 521 can be read from the first drive information area 502*a*. When the reproduction of the ECC block of the first drive information area 502*a* has been unsuccessful, it is determined that the drive information 521 cannot be read from the first drive information area 502*a*.

When it is determined that the drive information 521 can be read from the first drive information area 502*a* ("Yes" in step 901), the drive information read section 861 stores the read drive information 521 in the drive information storage buffer 840, and uses the drive information 521 (step 903). The drive information 521 can be used, for example, in the adjusting processing of the recording and reproduction conditions. Alternatively, the drive information 521 can be used to record data on the optical disk 101 or reproduce data recorded on the optical disk 101.

When it is determined that the drive information 521 cannot be read from the first drive information area 502*a* ("No" in step 901), the drive information read section 861 uses the reproduction control section 830 to determine whether or not the drive information 522 can be read from the second drive information area 502*b* in the optical disk 101 (step 902). The determination is performed based on whether or not the reproduction of the ECC block of the second drive information area 502*b* has been successful. When the reproduction of the ECC block of the second drive information area 502*b* has been successful, it is determined that the drive information 522 can be read from the second drive information area 502*b*. When the reproduction of the ECC block of the second drive information area 502*b* has been unsuccessful, it is determined that the drive information 522 cannot be read from the second drive information area 502*b*.

When it is determined that the drive information 522 can be read from the second drive information area 502*b* ("Yes"

in step 902), the drive information read section 861 stores the read drive information 522 in the drive information storage buffer 840, and uses the drive information 522 (step 904). The drive information 522 can be used, for example, in the adjusting processing of the recording and reproduction conditions. Alternatively, the drive information 522 can be used to record data on the optical disk 101 or reproduce data recorded on the optical disk 101.

When it is determined that the drive information 522 cannot be read from the second drive information area 502*b* ("No" in step 902), the drive information read section 861 generates drive information filled with NULL value "00"h, stores the drive information in the drive information storage buffer 840, and uses the drive information (step 905). The drive information filled with NULL value "00"h can be used, for example, in the adjusting processing of the recording and reproduction conditions. Alternatively, the drive information filled with NULL value "00"h can be used to record data on the optical disk 101 or reproduce data recorded on the optical disk 101.

In this manner, when the reproduction of the first ECC block of the drive information area 502 has been successful, the drive information read section 861 uses the drive information 521 recorded in the first drive information area 502*a*. When the reproduction of the first ECC block of the drive information area 502 has been unsuccessful but the reproduction of the second ECC block of the drive information area 502 has been successful, the drive information read section 861 uses the drive information 522 stored in the second drive information area 502*b*. When the reproduction of the first ECC block of the drive information area 502 has been unsuccessful and the reproduction of the second ECC block of the drive information area 502 has also been unsuccessful, the drive information read section 861 generates a drive information filled with the NULL value "00"h and uses the generated drive information.

In the case where the first drive information area 502*a* is formed of N ECC blocks, the determination in step 901 is performed based on whether or not the reproduction of all the N ECC blocks included in the first drive information area 502*a* has been successful. Herein, "N" is an arbitrary integer of 1 or more. When the reproduction of all the N ECC blocks included in the first drive information area 502*a* has been successful, it is determined that the drive information 521 can be read from the first drive information area 502*a*. When the reproduction of at least one ECC block has been unsuccessful, it is determined that drive information 521 cannot be read from the first drive information area 502*a*.

Similarly, in the case where the second drive information area 502*b* is formed of N ECC blocks, the determination in step 902 is performed based on whether or not the reproduction of all the N ECC blocks included in the second drive information area 502*b* has been successful. Herein, "N" is an arbitrary integer of 1 or more. When the reproduction of all the N ECC blocks included in the second drive information area 502*b* has been successful, it is determined that the drive information 522 can be read from the second drive information area 502*b*. When the reproduction of at least one ECC block has been unsuccessful, it is determined that drive information 522 cannot be read from the second drive information area 502*b*.

In the example of drive information read processing shown in FIG. 9, N=1.

Figure 10:
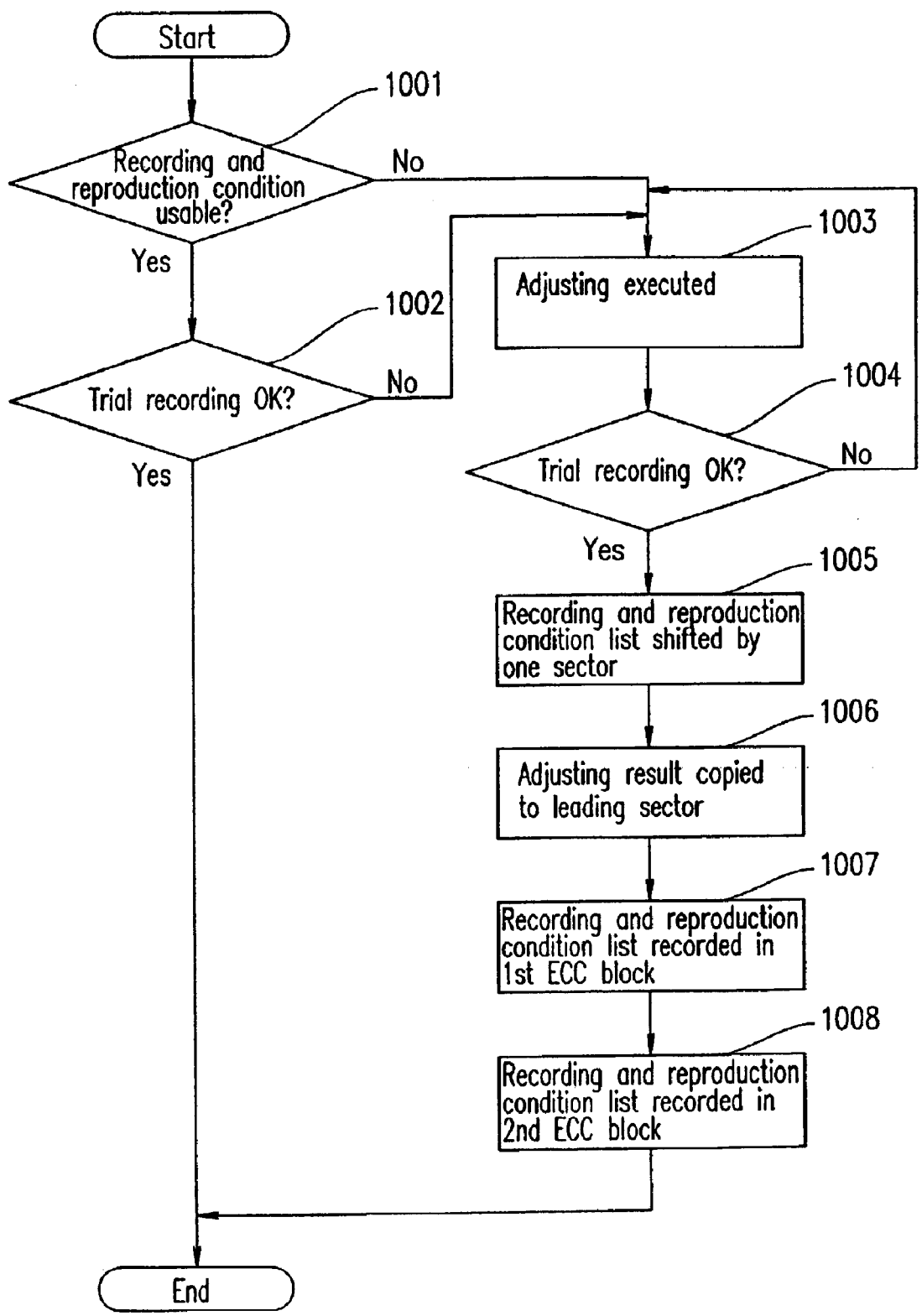
FIG. 10 is a flowchart representing adjusting processing and drive information update processing.

FIG. 10 shows a flowchart of the adjusting processing and drive information update processing. The adjusting processing is executed by the adjusting processing section 862. The drive information update processing is executed by the drive information update section 863.

The adjusting processing section 862 reads drive information stored in the drive information storage buffer 840 and determines whether or not a plurality of recording and reproduction conditions included in the drive information include a recording and reproduction condition usable by the optical disk apparatus 800 (step 1001). The determination is performed by, for example, comparing the manufacturer identifiers and the drive identifiers included in the recording and reproduction conditions with the manufacturer identifier and the drive identifiers possessed by the optical disk apparatus 800. When the recording and reproduction condition including a manufacturer identifier and a drive identifier matching with those of the optical disk apparatus 800 is included in the plurality of recording and reproduction conditions, the adjusting processing section 862 uses the recording control section 820 and the reproduction control section 830 in accordance with the recording and reproduction condition to record information on the optical disk 101 or reproduce information recorded on the optical disk 101.

The adjusting processing section 862 performs trial recording to determine whether or not the recording and reproduction condition is appropriate (step 1002). When recording and reproduction condition is determined to be appropriate, the processing is terminated without executing the adjusting processing or drive information update.

When a recording and reproduction condition including a manufacturer identifier and a drive identifier matching with those of the optical disk apparatus 800 is not included in the plurality of recording and reproduction conditions in step 1001, or when the recording and reproduction condition is determined not to be appropriate in step 1002, the adjusting processing section 862 executes the adjusting processing and stores the newly adjusted recording and reproduction condition in the data buffer 850 (step 1003). The adjusting processing section 862 uses the recording control section 820 and the reproduction control section 830 in accordance with the recording and reproduction condition stored in the data buffer 850 to record information on the optical disk 101 or reproduce information recorded on the optical disk 101.

The adjusting processing section 862 performs trial recording to determine whether or not the recording and reproduction condition is appropriate (step 1004). When recording and reproduction condition is determined not to be appropriate, the adjusting processing section 862 returns to step 1003 to execute the adjusting processing again and obtain a newly adjusted recording and reproduction condition.

When the recording and reproduction condition is determined to be appropriate in step 1004, the drive information update section 863 updates the drive information. The drive information is updated by shifting the contents of the recording and reproduction conditions recorded in the areas assigned numbers 0 through 14 to larger-number sectors by one sector (step 1005) and then writing the content of the recording and reproduction condition newly adjusted by the optical disk apparatus 800 into the area assigned number 0 (for example, the leading sector of the recording and reproduction condition list) (step 1006).

In this manner, the drive information stored in the drive information storage buffer 840 is updated (steps 1005 and 1006).

The drive information update section 863 uses the recording control section 820 to record the drive information updated in step 1005 and step 1006 in the first drive information area 502a (first ECC block of the drive information area 502) (step 1007). Thus, for example, the updated drive information (recording and reproduction condition list) is recorded in the first ECC block. Then, the drive information update section 863 records the same drive information as that recorded in step 1007 in the second drive information area 502b (second ECC block of the drive information area 502) (step 1008). Thus, for example, the updated drive information (recording and reproduction condition list) is recorded in the second ECC block.

In the case where the drive information stored in the drive information storage buffer 840 is filled with NULL value "00"h generated in step 905 shown in FIG. 9, the determination in step 1001 results in "No" and the processing advances to step 1003. The reason is that the recording and reproduction condition of the NULL value "00"h is not usable by all optical disk apparatuses. Accordingly, the drive information update section 863 updates the drive information in accordance with steps 1003 through 1008. As a result, the content of the recording and reproduction condition newly adjusted by the optical disk apparatus 800 is written in the area of each of the first drive information area 502a and the second drive information area 502b assigned number 0 (for example, the leading sector of the recording and reproduction condition list), and the NULL value "00"h is written in the areas of each of the first drive information area 502a and the second drive information area 502b assigned numbers 1 through 15.

In this manner, the drive information update section 863 updates the drive information so as to always record the newly adjusted recording and reproduction condition at the beginning of the recording and reproduction condition list. As a result, it is guaranteed that the drive information always includes the most recent 16 recording and reproduction conditions.

In the third example, the recording and reproduction condition list is updated by recording the newly adjusted recording and reproduction condition at the beginning of the list. Alternatively, the recording and reproduction condition list can be updated by recording the newly adjusted recording and reproduction condition at the end of the list. In this case, the recording and reproduction conditions in the list are shifted to smaller-number sectors by one sector and the recording and reproduction condition at the beginning of the list is deleted.

Figure 11:
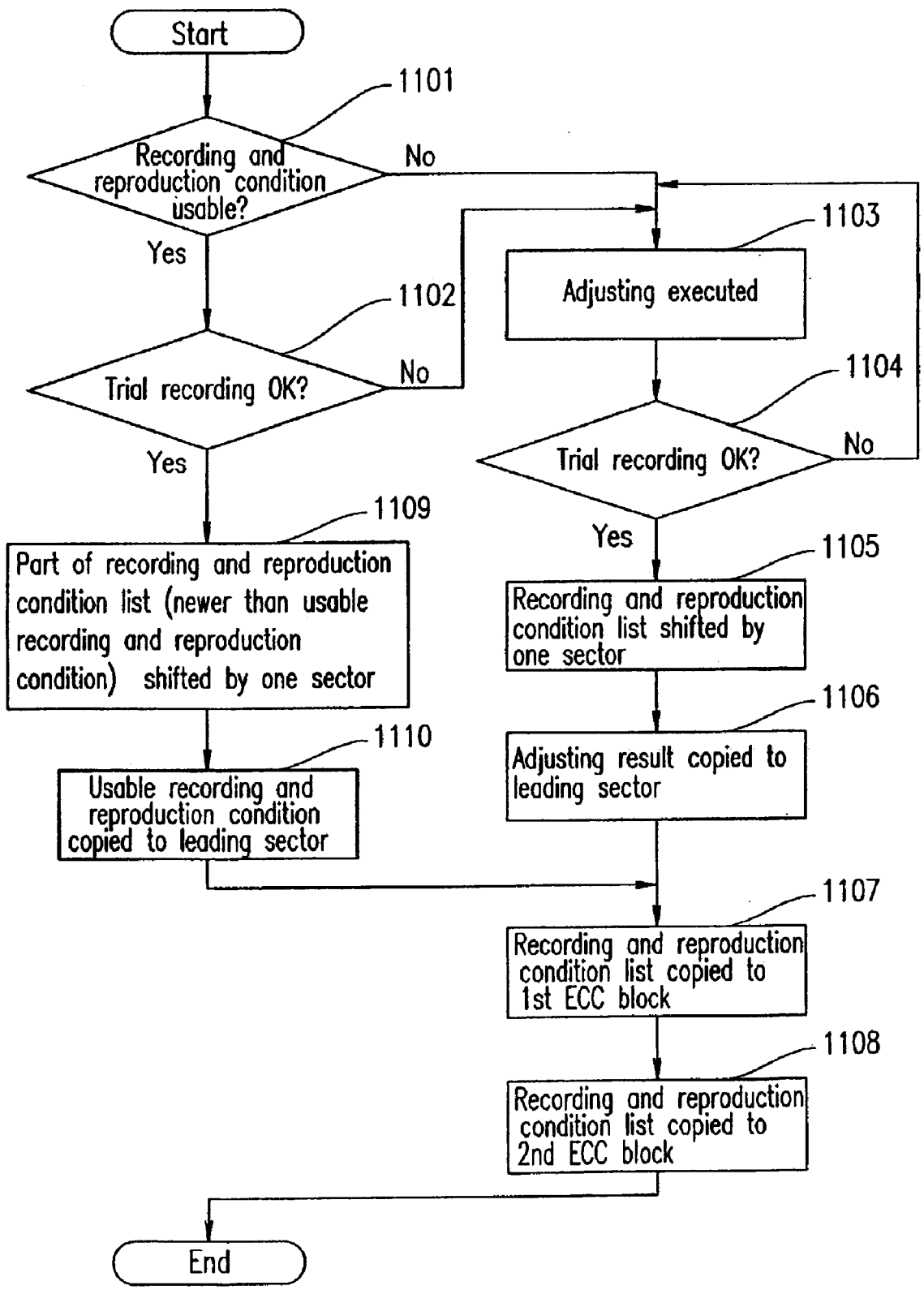
FIG. 11 is another flowchart representing adjusting processing and drive information update processing.

FIG. 11 shows another flowchart of the adjusting processing and drive information update processing. The adjusting processing is executed by the adjusting processing section 862. The drive information update processing is executed by the drive information update section 863.

In FIG. 11, steps 1101 through 1108 are identical as steps 1001 through 1008 shown in FIG. 10 and will not be described.

When the result of the trial recording is successful ("Yes" in step 1102; i.e., when the plurality of recording and reproduction conditions included in the drive information stored in the drive information storage buffer 840 includes a recording and reproduction condition usable by the optical disk apparatus 800 and as a result of trial recording, the usable recording and reproduction condition is determined to be appropriate), the drive information update section 863 once stores the recording and reproduction condition determined to be appropriate in the data buffer 850, and shifts the recording and reproduction conditions, which are located in sectors having numbers smaller than that of the sector having the recording and reproduction conditions which has been determined to be appropriate in step 1102, to larger-number sectors by one sector (step 1109). Then, the drive information update section 863 records the content of the recording and reproduction condition stored in the data buffer 850 into the area assigned number 0 (for example, the leading sector of the recording and reproduction condition) (step 1110).

In this manner, the drive information stored in the drive information storage buffer 840 is updated (steps 1109 and 1110).

The drive information update section 863 uses the recording control section 820 to record the drive information updated in steps 1109 and 1110 in the first block of the drive information area 502, i.e., the drive information area 502a (step 1107). For example, the updated drive information (recording and reproduction condition list) is recorded in the first ECC block in the drive information area 502. Then, the drive information update section 863 records the same information as that recorded in step 1107 in the second block of the drive information area 502, i.e., the drive information area 502b (step 1108). For example, the updated drive information (recording and reproduction condition list) is recorded in the second ECC block of the drive information area 502.

Thus, the drive information update section 863 always records the recording and reproduction condition usable by the optical disk apparatus 800, having the optical disk 101 mounted thereon, into the drive information area 502 as the recording and reproduction condition recorded most recently in the drive information area 502. As a result, it is guaranteed that the drive information always includes the most recent 16 recording and reproduction conditions.

In the third example, the recording and reproduction condition list is updated by shifting the recording and reproduction conditions, located in sectors having numbers smaller than that of the sector having the recording and reproduction condition which has been determined to be appropriate, to larger-number sectors by one sector, and recording the recording and reproduction condition stored in the data buffer 850 at the beginning of the recording and reproduction condition list. Alternatively, the recording and reproduction condition list can be updated by shifting the recording and reproduction conditions, located in sectors having numbers larger than that of the sector having the recording and reproduction condition which has been determined to be appropriate, to smaller-number sectors by one sector, and recording the recording and reproduction condition stored in the data buffer 850 at the end of the recording and reproduction condition list.

In the third example, the drive information area 502 includes the first drive information area 502a and the second drive information area 502b. Alternatively, the drive information area 502 can include L-pieces of drive information areas (first drive information area 502-1 through L'th drive information area 502-L). Herein, "L" is an integer of 2 or greater. In this case, the following operation can be performed. It is determined whether the drive information can be read from the drive information areas, starting from the first drive information area 502-1 toward the L'th drive information area 502-L. The drive information successfully read is stored in the drive information storage buffer 840. In the case where the drive information cannot be read from any of the first drive information area 502-1 through L'th drive information area 502-L, drive information filled with NULL value "00"h can be stored in the drive information storage buffer 840. Such processing is similar to the drive information read processing shown in FIG. 9.

On an information recording medium according to the present invention, a plurality of recording and reproduction conditions are arranged in the order of time at which the recording and reproduction conditions are recorded on the information recording medium. Thus, it is guaranteed that the drive information always includes the most recent recording and reproduction conditions without having a redundant identifier such as an adjusting order identifier.

On an information recording medium according to the present invention, a first drive information area for recording first drive information and a second drive information area for recording second drive information are provided. The first drive information and the second drive information are updated so as to have identical contents with each other. Thus, the risk of failing to reproduce a recording and reproduction condition, due to scratches in the first drive information area or the second drive information area, or dust or fingerprint attached to the first drive information area or the second drive information area, is reduced.

According to an information recording and reproduction method of the present invention, in the case where a plurality of recording and reproduction conditions included in the drive information do not include a recording and reproduction condition usable by the optical disk apparatus having an optical disk mounted thereon, the plurality of recording and reproduction conditions included in the drive information are shifted toward larger-number sectors one by sector and the recording and reproduction condition found by the adjusting processing is added to the beginning of the drive information. Thus, the drive information is updated. In the case where a plurality of recording and reproduction conditions included in the drive information include a recording and reproduction condition usable by the information recording and reproduction apparatus having an information recording medium mounted thereon, the recording and reproduction conditions located in sectors having smaller numbers than the sector having the usable recording and reproduction condition are shifted to larger-number sectors by one sector and the usable recording and reproduction condition is shifted to the beginning of the drive information. Thus, the drive information is updated. As a result, it is guaranteed that the drive information always includes the most recent recording and reproduction conditions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording and reproduction method for an information recording medium including a data recording area for recording data, a first drive information area for recording first drive information, and a second drive information area for recording second drive information, wherein: the first drive information and the second drive information each include a plurality of recording and reproduction conditions, the method comprising the steps of:

(a) determining whether or not the first drive information can be read from the first drive information area;

(b) determining whether or not the second drive information can be read from the second drive information area;

(c) determining whether or not the plurality of recording and reproduction conditions included in the second drive information include a recording and reproduction condition usable by the information recording and reproduction apparatus having the information recording medium mounted thereon; and (d) when the first drive information cannot be read, the second drive information can be read, and the second drive information does not include the usable recording and reproduction condition, adjusting a new recording and reproduction condition usable by the information recording and reproduction apparatus having the information recording medium mounted thereon, and using the new recording and reproduction condition and the second drive information to update the first drive information and the second drive information.

2. An information recording and reproduction method according to claim 1, further comprising the step of: when the second drive information can be read, using the second drive information to record and reproduce the data.

3. An information recording and reproduction method according to claim 1, wherein the step (d) includes the step of recording the recording and reproduction condition usable by the information recording and reproduction apparatus having the information recording medium mounted thereon, the recording and reproduction condition being recorded in the second drive information as the recording and reproduction condition recorded in the second drive information most recently.

4. An information recording and reproduction method according to claim 1, wherein the first drive information area and the second drive information area each include areas assigned numbers 0 through M (where M is an integer number greater than 0), the first drive information and the second drive information each include M+1 recording and reproduction conditions, the M+1 recording and reproduction conditions are written in the areas of each of the first drive information area and the second drive information area assigned numbers 0 through M in the order from the recording and reproduction condition recorded on the information recording medium most recently to the recording and reproduction condition recorded on the information recording medium least recently, and the step (d) includes the steps of:

(d-1) writing contents of the recording and reproduction conditions, which are written in the areas of the second drive information area assigned numbers 0 through M−1 into the areas of each of the first drive information area and the second drive information area assigned numbers 1 through M; and (d-2) writing a content of the new recording and reproduction condition in the area of each of the first drive information area and the second drive Information area assigned number 0.

5. An information recording and reproduction method according to claim 1, further comprising the step of (e) when the first drive information cannot be read, the second drive information can be read, and the second drive information includes the usable recording and reproduction condition, using the usable recording and reproduction condition and the second drive information to update the first drive information and the second drive information.

6. An information recording and reproduction method according to claim 5, wherein the first drive information area and the second drive information area each include areas assigned numbers 0 through 15, the first drive information and the second drive information each include 16 recording and reproduction conditions, the 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently, the usable recording and reproduction condition is written in the area of the second information area assigned number m, and the step (d) includes the steps of:

(d-1) reading the usable recording and reproduction condition from the area of the second drive information area assigned number m;

(d-2) writing contents of the recording and reproduction conditions, which are written in the areas of the second drive information area assigned numbers 0 through (m-1), into the areas of each of the first drive information area and the second drive information area assigned numbers 1 through m; and (d-3) writing a content of the read usable recording and reproduction condition in the area of each of the first drive information area and the second drive information area assigned number 0.

7. An information recording and reproduction method according to claim 1, wherein the second drive information area is formed of N ECC blocks for calculating an error correction code, the N ECC blocks each include a plurality of sectors, the plurality of recording and reproduction conditions included in the second drive information are each recorded in a corresponding sector among the plurality of sectors, and N is an integer of 1 or greater.

8. An information recording and reproduction method according to claim 7, wherein the determination on whether or not the second drive information can be read is performed based on whether or not the reproduction of all the N ECC blocks included in the second drive information area has been successful.

9. An information recording and reproduction apparatus for an information recording medium including a data recording area for recording data, a first drive information area for recording first drive information, and a second drive information area for recording second drive information, wherein: the first drive information and the second drive information each include a plurality of recording and reproduction conditions, the apparatus comprising:

a drive information read section;

an adjusting processing section; and a drive information update section, wherein:

the drive information read section determines whether or not the first drive information can be read from the first drive information area;

the drive information read section determines whether or not the second drive information can be read from the second drive information area;

the adjusting processing section determines whether or not the plurality of recording and reproduction conditions included in the second drive information include a recording and reproduction condition usable by the information recording and reproduction apparatus, and when the first drive information cannot be read, the second drive information can be read, and the second drive information does not include the usable recording and reproduction condition, the adjusting processing section adjusts a new recording and reproduction condition usable by the information recording and reproduction apparatus, and the drive information update section uses the new recording and reproduction condition and the second drive information to update the first drive information and the second drive information.

10. An information recording and reproduction apparatus according to claim 9, further comprising a control section for, when the second drive information can be read, using the second drive information to record and reproduce the data.

11. An information recording and reproduction apparatus according to claim 9, wherein the drive information update section records the recording and reproduction condition usable by the information recording and reproduction apparatus in the second drive information as the recording and reproduction condition recorded in the second drive information most recently.

12. An information recording and reproduction apparatus according to claim 9, wherein:

the first drive information area and the second drive information area each include areas assigned numbers 0 through M (where M is an integer number greater than 0), the first drive information and the second drive information each include M+1 recording and reproduction conditions, the M+1 recording and reproduction conditions are written in the areas of each of the first drive information area and the second drive information area assigned numbers 0 through M in the order from the recording and reproduction condition recorded on the information recording medium most recently to the recording and reproduction condition recorded on the information recording medium least recently, and the drive information update section writes contents of the recording and reproduction conditions, which are written in the areas of the second drive information area assigned numbers 0 through M−1, into the areas of each of the first drive information area and the second drive information area assigned numbers 1 through M, and writes a content of the new recording and reproduction condition in the area of each of the first drive information area and the second drive information area assigned number 0.

13. An information recording and reproduction apparatus according to claim 9, wherein when the first drive information cannot be read, the second drive information can be read, and the second drive information includes the usable recording and reproduction condition, the drive update section uses the usable recording and reproduction condition and the second drive information to update the first drive information and the second drive.

14. An information recording and reproduction apparatus according to claim 13, wherein:

the first drive information area and the second drive information area each include areas assigned numbers 0 through 15, the first drive information and the second drive information each include 16 recording and reproduction conditions, the 16 recording and reproduction conditions are written in the areas of each of the first drive information area and the second drive information area assigned numbers 0 through 15 in the order from the recording and reproduction condition recorded on the information recording medium most recently to the recording and reproduction condition recorded on the information recording medium least recently, the usable recording and reproduction condition is written in an area of the second drive information area assigned number m, and the drive information update section reads the usable recording and reproduction condition from the area of the second drive information area assigned m, writes contents of the recording and reproduction conditions, which are written in the areas of the second drive information area assigned numbers 0 through (m−1), into the area of each of the first drive information area and the second drive information area assigned numbers 1 through m, and writes the content of the read usable recording and reproduction condition in the areas of each of the first drive information area and the second drive information area assigned number 0.

15. An information recording and reproduction apparatus according to claim 9, wherein the second drive information area is formed of N ECC blocks for calculating an error correction code, the N ECC blocks each include a plurality of sectors, the plurality of recording and reproduction conditions included in the second drive information are each recorded in a corresponding sector among the plurality of sectors, and N is an integer of 1 or greater.

16. An information recording and reproduction apparatus according to claim 15, wherein the determination on whether or not the second drive information can be read is performed based on whether or not the reproduction of all the N ECC blocks included in the second drive information area has been successful.

17. A method for processing information for an information recording medium including a data recording area for recording data, a first drive information area for recording first drive information, and a second drive information area for recording second drive information, wherein: the first drive information and the second drive information each include a plurality of recording and reproduction conditions, the method comprising the steps of:

(a) determining whether or not the first drive information can be read from the first drive information area;

(b) determining whether or not the plurality of recording and reproduction conditions included in the first drive information include a recording and reproduction condition usable by an information recording and reproduction apparatus having the information recording medium mounted thereon; and (c) when the first drive information can be read and the first drive information does not include the usable recording and reproduction condition, determining to adjust a new recording and reproduction condition usable by the information recording and reproduction apparatus having the information recording medium mounted thereon, and using the new recording and reproduction condition and the first drive information to update the first drive information and the second drive information, wherein the first drive information area and the second drive information area each include areas assigned numbers 0 through M (where M is an integer greater than 0), the first drive information and the second drive information each include M+1 recording and reproduction conditions, the M+1 recording and reproduction conditions are written in the areas of each of the first drive information area and the second drive information area assigned numbers 0 through M in the order from the recording and reproduction condition recorded on the information recording medium most recently to the recording and reproduction condition recorded on the information medium least recently, and the step (c) includes the steps of: (c-1) preparing contents of the recording and reproduction conditions, which are to be written in the areas of the first drive information area assigned numbers 0 through M−1, into the areas of each of the first drive information area and the second drive information area assigned numbers 1 through M; and (c-2) preparing a content of the new recording and reproduction condition in the area of each of the first drive information area and the second information area assigned number 0.

18. A processor for processing information for an information recording medium including a data recording area for recording data, a first drive information area for recording first drive information, and a second drive information area for recording second drive information, wherein: the first drive information and the second drive information each include a plurality of recording and reproduction conditions, the processor comprising: a first determining section; a second determining section; and a third determining section, wherein:

the first determining section determines whether or not the drive information can be read from the first drive information area;

the second determining section determines whether or not the plurality of recording and reproduction conditions included in the first drive information include a recording and reproduction condition usable by an information recording and reproduction apparatus; and when the first drive information can be read and the first drive information does not include the usable recording and reproduction condition, the second determining section determines to adjust a new recording and reproduction condition usable by the information recording and reproduction apparatus, and the third determining section determines to use the new recording and reproduction condition and the first drive information to update the first drive information and the second drive information, wherein: the first drive information area and the second drive information area each include areas assigned numbers 0 through M (where M is an integer greater than 0), the first drive information and the second drive information each include M+1 recording and reproduction conditions, the M+1 recording and reproduction conditions are written in the areas of each of the first drive information area and the second drive information area assigned numbers 0 through M in the order from the recording and reproduction condition recorded on the information recording medium most recently to the recording and reproduction condition recorded on the information recording medium least recently, and the third determining section prepares contents of the recording and reproduction conditions, which are to be written in the areas of the first drive information area assigned numbers 0 through M−1, into the areas of each of the first drive information area and the second drive information area assigned numbers 1 through M, and prepares a content of the new recording and reproduction condition in the area of each of the first drive information area and the second drive information area assigned number 0.

* * * * *

UNITED STATES PATENT AND TRADEMARK OFFICE
CERTIFICATE OF CORRECTION

PATENT NO. : 6,940,795 B2
DATED : September 6, 2005
INVENTOR(S) : Toshiyuki Fukushima et al.

It is certified that error appears in the above-identified patent and that said Letters Patent is hereby corrected as shown below:

Title page,
Item [57], ABSTRACT,
Line 3, "information:" should read -- information; --.

Column 24,
Line 50, "Information" should read -- information --.

Column 26,
Line 51, "the second drive." should read -- the second drive information. --.

Signed and Sealed this

Twenty-first Day of February, 2006

JON W. DUDAS
*Director of the United States Patent and Trademark Office*